United States Patent
Schaller et al.

(10) Patent No.: US 7,085,225 B2
(45) Date of Patent: Aug. 1, 2006

(54) SYSTEM AND METHOD FOR PROVIDING DETECTION OF FAULTS AND SWITCHING OF FABRICS IN A REDUNDANT-ARCHITECTURE COMMUNICATION SYSTEM

(75) Inventors: William S Schaller, Stittsville (CA); Francois Z Meguerditchian, Aylmer (CA); Xi S. Chen, Nepean (CA); Dan G. M. Gravelle, Kanata (CA)

(73) Assignee: Alcatel Canada Inc., Kanata (CA)

( * ) Notice: Subject to any disclaimer, the term of this patent is extended or adjusted under 35 U.S.C. 154(b) by 999 days.

(21) Appl. No.: 09/963,520

(22) Filed: Sep. 27, 2001

(65) Prior Publication Data

US 2003/0112746 A1    Jun. 19, 2003

(51) Int. Cl.
 *H04L 1/16* (2006.01)

(52) U.S. Cl. .................... 370/217; 370/221; 370/225; 370/242; 370/248
(58) Field of Classification Search ............ 370/216, 370/217, 218, 219, 220, 221, 223, 224, 225, 370/227, 228, 242, 248, 252
See application file for complete search history.

(56) References Cited

U.S. PATENT DOCUMENTS

| | | | | |
|---|---|---|---|---|
| 4,517,639 A | * | 5/1985 | Ferrell et al. | 700/81 |
| 5,200,950 A | | 4/1993 | Foglar et al. | 370/219 |
| 5,477,531 A | * | 12/1995 | McKee et al. | 370/249 |
| 5,485,453 A | | 1/1996 | Wahlman et al. | 370/389 |
| 5,715,237 A | | 2/1998 | Akiyoshi | 370/389 |
| 6,188,666 B1 | * | 2/2001 | Cornell | 370/217 |
| 6,798,740 B1 | * | 9/2004 | Senevirathne et al. | 370/219 |

FOREIGN PATENT DOCUMENTS

WO    WO 01/65783    9/2001

* cited by examiner

*Primary Examiner*—Dang Ton
*Assistant Examiner*—Shick Hom
(74) *Attorney, Agent, or Firm*—Marks & Clerk; Richard J. Mitchell

(57) ABSTRACT

A system and method of selecting a routing datapath between an active datapath and a redundant datapath for a communication device are provided. The system and method are embodied in a first step of monitoring for a fault occurring in the active datapath and the redundant datapath and upon detection of the fault, a second step of evaluating severity of the fault against a threshold. Further, if the severity of the fault exceeds the threshold and if the fault is associated with the active datapath, then switching the routing datapath from the active datapath to the redundant datapath. If the severity of the fault exceeds the threshold and if the fault is associated with the redundant datapath, then switching the routing datapath of the communications from redundant datapath to the active datapath.

23 Claims, 14 Drawing Sheets

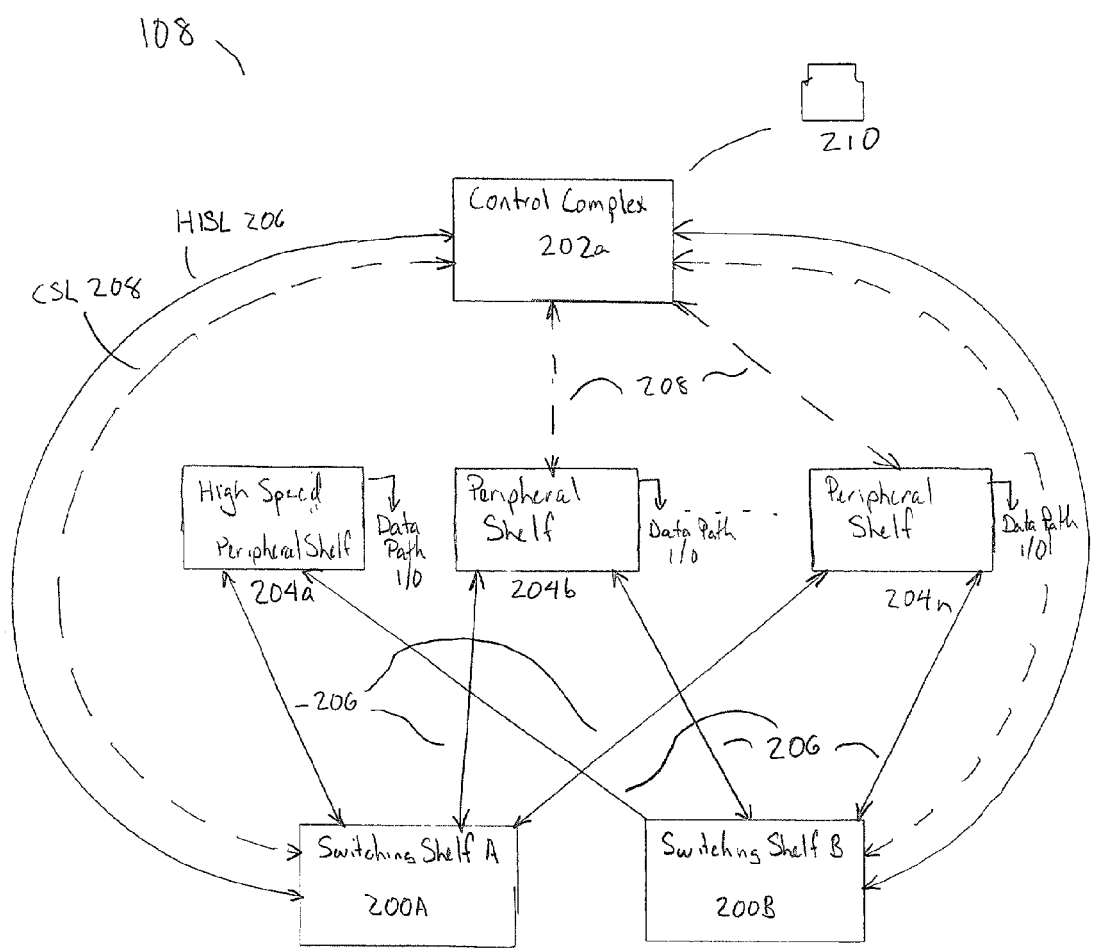

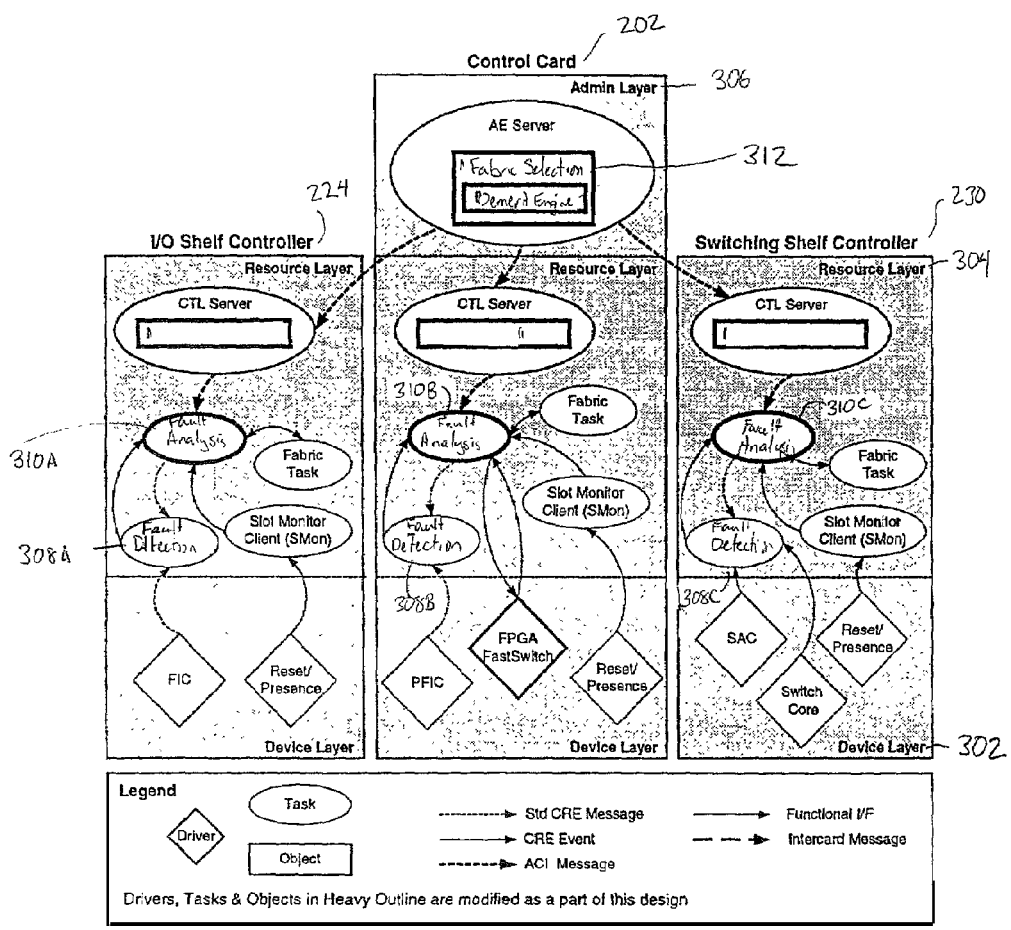

Fig 6B. Physical and Logical Error Tables
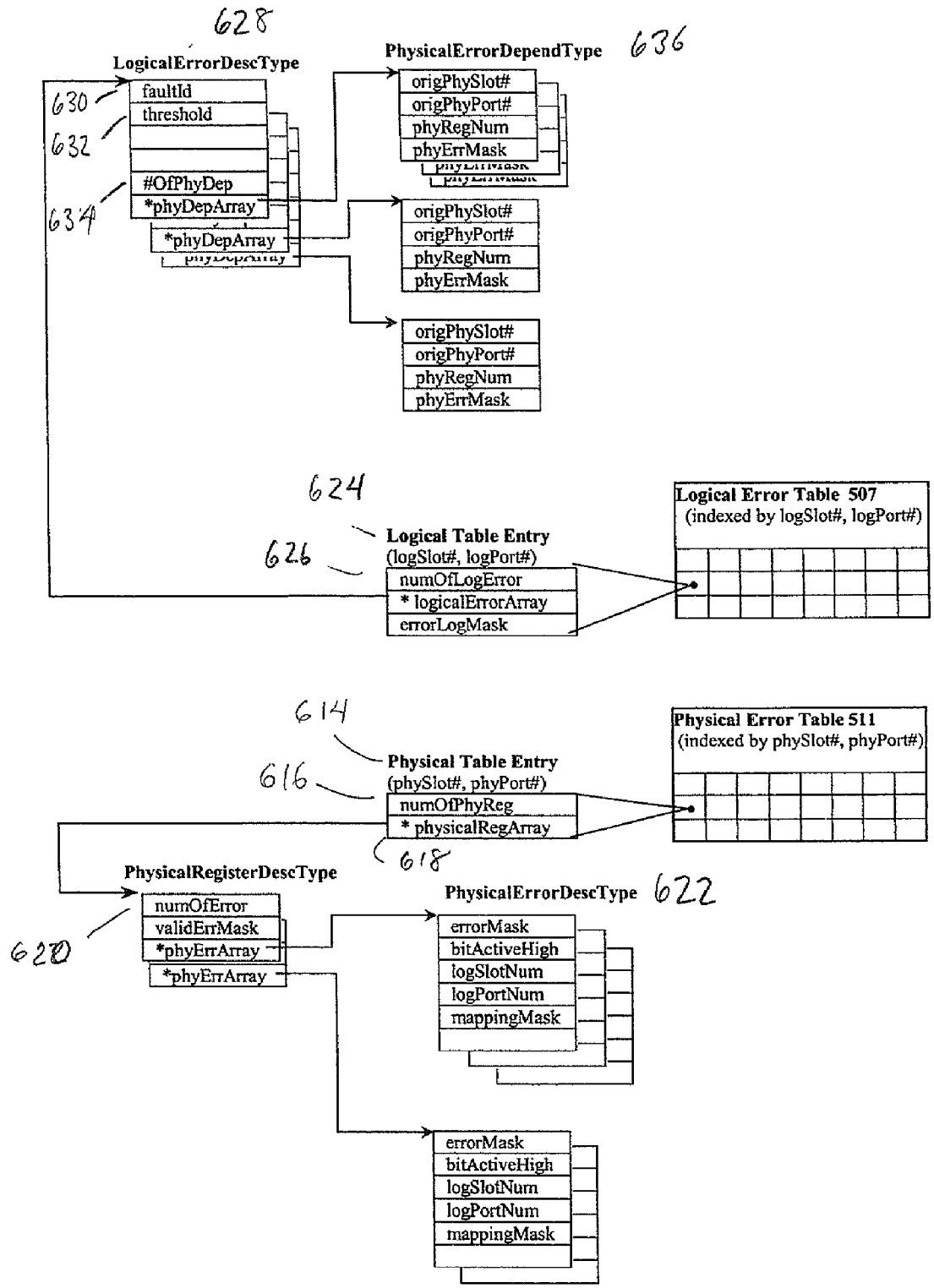

SYSTEM AND METHOD FOR PROVIDING DETECTION OF FAULTS AND SWITCHING OF FABRICS IN A REDUNDANT-ARCHITECTURE COMMUNICATION SYSTEM

FIELD OF THE INVENTION

The invention relates to a system and method providing switching of communication paths in a communication device upon detection and analysis of faults in one or more of datapaths.

BACKGROUND OF INVENTION

Many communication switch and router systems architecture provide redundant communication capabilities. Lucent Technologies, Murray Hill, N.J. has announced a redundant system under its MSC 25000 Multiservice Packet Core Switch (trade-mark of Lucent Technologies). Marconi plc, London, England has announced a redundant system under its BXR 48000 router (trade-mark of Marconi plc).

Redundancy in a router system can be provided on two levels. A first level provides redundancy within a single shelf for a communication switch. Therein, two or more modules provide redundant communication capabilities for another communication module on the same shelf. A second type of redundancy provides fabric redundancy beyond the switch matrix cards and includes fabric interface cards (FICs) installed on input/output (I/O) shelves, high-speed inter-shelf links (HISL) cables connecting I/O shelves and Switch Access Cards (SACs) installed in switching shelves.

In addition, any fabric redundancy implementation may need to comply with Bellcore standards when executing a complete datapath switchover. The current Bellcore standard mandates that a switchover must be completed within 60 ms upon detection of a fault in any switching fabric. Further, software detection of an error should occur within 20 ms (non Bellcore specification).

Prior art systems providing fabric redundancy do not provide a flexible method of tracking the location of errors in a switching fabric and do not provide an indication where faults occurred and how the switching mechanism reacted to faults.

Further, prior art redundancy systems do not enable particular fabrics to be isolated to prevent that fabric from causing fabric switchovers.

Further, prior art systems do not provide a mechanism to recover automatically from control path isolation or shelf controller resets.

There is a need for a system and method providing switching redundancy that improves upon the prior art systems.

SUMMARY OF INVENTION

In a first aspect, a method of selecting a routing datapath between an active datapath and a redundant datapath for a communication device is provided. The method comprises a first step of monitoring for a fault occurring in the active datapath and the redundant datapath and upon detection of the fault, a second step of evaluating severity of the fault against a threshold. Further, for the method, if the severity of the fault exceeds the threshold and if the fault is associated with the active datapath, then the method switches the routing datapath from the active datapath to the redundant datapath. If the severity of the fault exceeds the threshold and if the fault is associated with the redundant datapath, then the method updates a health score associated with the redundant datapath with information about the fault.

The method may, for the first step, determine if the fault is a first fault for the active datapath and for the second step, if the fault is the first fault, set the severity above the threshold.

In a second aspect, a method of selecting a routing datapath between an active datapath and a redundant datapath for a communication device is provided. The method comprises a first step of monitoring for a first fault occurring in the active datapath, upon detection of the first fault, a second step of switching the routing datapath to the redundant datapath, a third step of monitoring for a subsequent fault occurring in the active datapath and the redundant datapath, a fourth step of tracking the subsequent fault with any previous faults for active and redundant datapaths and evaluating the subsequent fault with the any previous faults against a threshold. Further if the threshold is exceeded and if the subsequent fault is associated with the active datapath, then the method switches the routing datapath of the communications from active datapath to the redundant datapath.

The method may, for the first step, monitor the active datapath for faults in the active datapath and generate a first fault report upon detection of each of the faults in the active datapath. Further, the first step may monitor the redundant datapath for faults in the redundant datapath and generate a second fault report upon detection of each of the faults in the redundant datapath.

The method may, for the fourth step, additionally receive the first fault report from a first monitoring module and update a first fault report for the active datapath, receive the second fault report from the second monitoring module, update a second fault report for the redundant datapath and generate a comparison value of the first and second fault reports to identify which of the active and redundant datapaths is healthier.

The method may have earlier faults cleared and have the first and second fault reports updated to remove the earlier faults.

The method may have the first and second fault reports utilize separate data structures each comprising an entry for each element reporting the faults.

The method may have data sent through the active datapath and the redundant datapath at approximately the same time. Further, upon switching of the routing datapath, the method may cause the switching of the routing datapath at an egress point in the communication device.

The method may have the egress point as an egress line card in the communication device.

The method may have the first and third steps conducted by a fault detection unit receiving fault messages from a driver associated with a physical location in the communication device related to the fault messages.

The method may have the fault detection unit debouncing the fault messages and reporting the fault messages to a fault analysis unit associated with the physical location.

The method may have the fault detection unit utilizing one state machine for each of the fault messages to debounce the fault messages.

The method may have the fault analysis unit performing the second step.

The method may have the fault detection unit utilizing global data to store information relating to each of the fault messages.

The method may have, for a given fault message, the fault detection unit accessing the global data to allow initiation of a state machine associated with the given fault.

The method may have, for the third step, the fault detection unit advising a fabric selection unit of the subsequent fault and the fabric selection unit performing the fourth step.

The method may have the fabric selection unit located at a central location in the communication device.

The method may have the fabric selection unit assigning a fault weight value to each subsequent fault and any previous faults.

In a third aspect, a method of selecting a routing datapath between an active datapath and a redundant datapath of a communication device is provided. The method comprises monitoring for an event occurring in either the active datapath or the redundant datapath. Also, upon detection of the event the method updates a first status associated with a first set of components in the active datapath if the event occurred in the active datapath and updates a second status associated with a second set of components in the redundant datapath if the event occurred in the redundant datapath. Further the method performs an evaluation the first status and the second status against at least one failure threshold and selects the routing datapath according to the evaluation.

In a fourth aspect, a switch is provided. The switch provides a routing datapath between a first datapath in a first fabric and a second datapath in a second fabric. The switch comprises the first datapath being an active datapath, the second datapath being a redundant datapath for the active datapath, a fault detection unit associated with the first and second datapaths, a fault analysis unit associated with the fault detection unit and a fabric selection unit associated with the fault detection unit. Further, the fault detection system monitors for a fault occurring in the active datapath and the redundant datapath, and upon detection of the fault, the fault analysis unit evaluates severity of the fault against a threshold. If the severity of the fault exceeds the threshold then if the fault is associated with the active datapath, the fabric selection unit switches the routing datapath from the active datapath to the redundant datapath.

In a fifth aspect, a switch is provided. The switch provides a routing datapath between a first datapath in a first fabric and a second datapath in a second fabric. The switch comprises the first datapath being an active datapath, the second datapath being a redundant datapath for the active datapath, a fault detection unit associated with the first and second datapaths, a fault analysis unit associated with the fault detection unit and a fabric selection unit associated with the fault detection unit. Further, the fault detection unit monitors for a first fault occurring in the active datapath. Upon detection of the first fault, the fabric selection unit switches the routing datapath to the redundant datapath. The fault detection unit also monitors for a subsequent fault occurring in the active datapath and the redundant datapath. The fault analysis unit tracks and reports the subsequent fault to the fabric selection unit. The fabric selection unit evaluates the subsequent fault with any previous faults for active and redundant datapaths and evaluates the subsequent fault with the any previous faults against a threshold. If the threshold is exceeded and if the subsequent fault is associated with the active datapath, then the fabric selection unit switches the routing datapath from active datapath to the redundant datapath.

The switch may also have the fault detection unit monitoring the active datapath for faults in the active datapath, advising the fault analysis unit of the faults in the active datapath monitoring the redundant datapath for faults in the redundant datapath and advising the fault analysis unit of the faults in the active datapath. The fault analysis unit may also generate a first fault report of the faults in the active datapath and provide same to the fabric selection unit and generate a second fault report of the faults in the redundant datapath and provide same to the fabric selection unit.

The switch may also have the fabric selection unit generating a comparison value of the first and second fault reports to identify which of the active and redundant datapaths is healthier.

In other aspects of the invention, various combinations and subset of the above aspects are provided.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes):

FIG. 2A is a block diagram of components of the switch of FIG. 1;

FIG. 3 is a block diagram of software elements of the switch of FIG. 1;

FIG. 6B is a block diagram of physical and logical error tables associated with the fault detection unit of FIG. 6A;

DETAILED DESCRIPTION OF THE EMBODIMENTS

Figure 1:
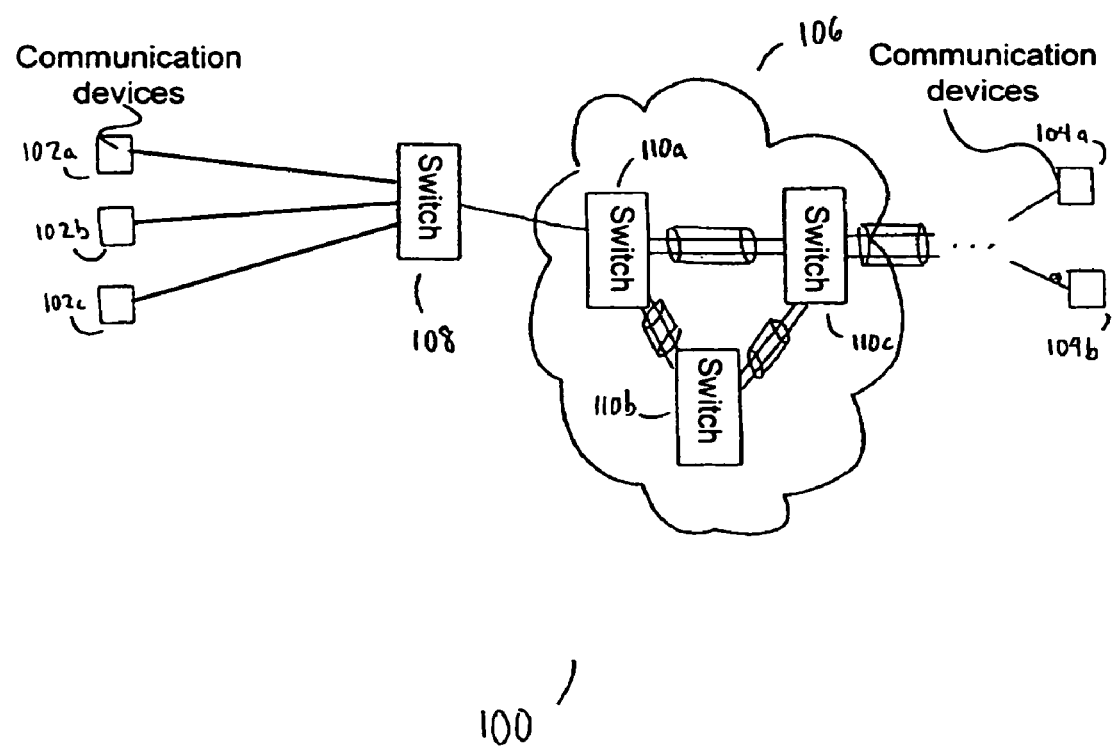
FIG. 1 is a block diagram of a communication network utilizing a switch embodying the invention.

The description, which follows, and the embodiments described therein, is provided by way of illustration of an example, or examples, of particular embodiments of the principles of the present invention. These examples are provided for the purposes of explanation, and not limitation, of those principles and of the invention. In the description, which follows, like parts are marked throughout the specification and the drawings with the same respective reference numerals.

1.0 Basic Features of System

Briefly, the system of the embodiment provides a system for processing data traffic through a routing system or communication switch utilizing a redundant data switching fabric or datapath. The system continually evaluates the health of internal datapaths of the routing system. Typically, one datapath is selected as the active datapath and another as the redundant datapath to the active datapath. From the evaluation, the system determines whether and when to switch the internal datapath from one datapath to another datapath.

For the embodiment, there are two types of switchovers. The first type is performed when the active datapath and the redundant datapath are operating without any recent errors therein and subsequently, a first error is detected in either datapath. If the first error occurs in the active datapath, a switchover is performed. It may be necessary that a first switchover is completed within Bellcore timing standards. Special hardware and software is provided by the embodiment to process a switchover for a first error. The second type is performed after a first error has been detected and subsequently another error has been detected before all previous errors have been cleared. For these subsequent errors, the embodiment determines which fabric is healthier and then causes a switchover, to the healthier fabric, if necessary.

The system provides five basic features in detecting errors and initiating switchovers:

1. Fabric Fault Detection

The system executes fabric redundancy switchover in real time on every shelf controller in the multi-shelf system. A local monitoring system on a shelf enables early detection of datapath faults. Errors are detected on all components for each fabric link and in the switching core as a whole.

2. Fabric Switchover

The system provides fabric switchover in compliance with Bellcore standards, for example, GR-1110-CORE. In particular, when both fabrics are deemed to be in good operational order, if a first fault on any component along the active datapath is detected, a switchover is initiated to the redundant datapath. The system monitors for datapath hardware detected fault interrupts using software modules. When a first fault is detected from either fabric, the system triggers a hardware circuit, which executes a switchover to the redundant fabric if the fault is on the good fabric within the Bellcore timing standards. This is referred to as a "fast switch" in this specification. Accordingly, the system ensures that a single fault occurring in a switching fabric or fabric interface will not disrupt traffic flow on any fabric link.

3. Multiple Fault Recovery

Upon the detection of multiple faults, the system determines which switching fabric is healthier, i.e. is better able to process data traffic, in spite of its detected faults. The system evaluates multiple fault conditions detected on both switching fabrics and selects the healthier fabric.

4. Fabric Selection Rules

In assessing multiple faults, a set of fabric selection rules is defined and used by the system to process new faults as they are detected and to update a score representing the overall health of the fabric. Different weights are assigned to each fault condition on each fabric. The fabric selection unit tracks all faults for a fabric and tallies the scores for all faults. The fabric selection unit operates at a central location.

5. Fabric Maintenance

An operator of the system has control over the fabric redundancy operation through a terminal connected to the system.

2.0 System Architecture

The following is a description of a network associated with the switch associated with the embodiment.

Referring to FIG. 1, a communication network 100 is shown. Network 100 allows devices 102A, 102B, and 102C to communicate with devices 104A and 104B through network cloud 106. At the edge of network cloud 106, switch 108 is the connection point for devices 102A, 102B and 102C to network cloud 106. In network cloud 106, a plurality of switches 110A, 110B and 110C are connected forming the communications backbone of network cloud 106. In turn, connections from network cloud 106 to devices 104A and 104B.

Switch 108 incorporates the redundant switch fabric architecture of the embodiment. It will be appreciated that terms such as "routing switch", "communication switch", "communication device", "switch" and other terms known in the art may be used to describe switch 108. Further, while the embodiment is described for switch 108, it will be appreciated that the system and method described herein may be adapted to any switching system, including switches 110A, 110B and 110C.

Figure 2B:
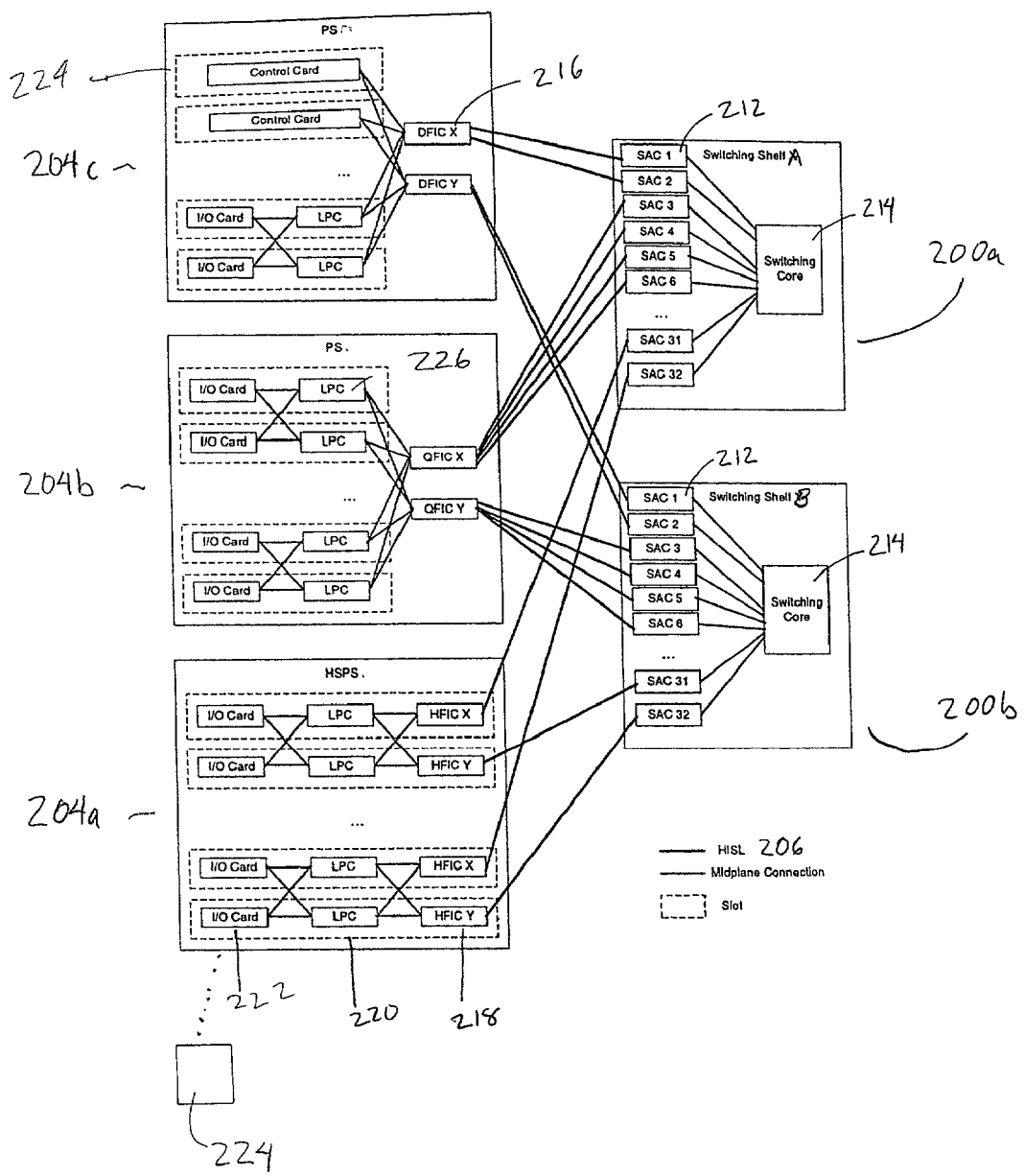
FIG. 2B is a block diagram of components and connections of the switch of FIG. 2A.

Referring to FIGS. 2A and 2B, switch 108 is a multi-protocol backbone system, which can process both of ATM cells IP traffic through its same switching fabric. In the present embodiment, switch 108 allows scaling of the switching fabric capacity from 50 Gbps to 450 Gbps in increments of 14.4 Gbps simply by the insertion of additional shelves into the multishelf switch system.

Switch 108 is a multi-shelf switching system enabling a high degree of re-use of single shelf technologies. Switch 108 comprises two switching shelves 200A and 200B, control complex 202a and peripheral shelves 204A . . . 204O, (providing a total of 15 peripheral shelves) and the various shelves and components in switch 108 communicate with each other through data links. Switching shelf 200A and 200B provide cell switching capacity for switch 108. Peripheral shelves 204 provide I/O for switch 108, allowing connection of devices, like customer premise devices (CPEs) 102A, 102B, and 102C to switch 108. Control complex 202a is a separate shelf with control cards, which provide central management for switch 108.

Communication links enable switching shelves 200, peripheral shelf 204 and control complex 202a to communicate data and status information with each other. High Speed Inter Shelf Links (HISL) 206 and Control Service Links (CSLs) 208 link control complex 202 on peripheral shelf 204A with switching shelves 200A and 200B. HISLs 206 also link switching shelves 200 with peripheral shelves 204. CSLs 208 link control complex 202 with the other peripheral shelves 204B . . . 204O.

Terminal 210 is connected to switch 108 and runs controlling software, which allows an operator to modify, and control the operation of, switch 108.

Each switching shelf 200A and 200B contains a switching fabric core 214 and up to 32 switch access cards (SAC) 212. Each SAC 212 provides 14.4 Gbps of cell throughput to and from core 214. Each SAC 212 communicates with the rest of the fabric through fabric interface cards 218 on the peripheral shelves 204.

There are two types of peripheral shelves 204. The first type is a High Speed Peripheral Shelf (HSPS), represented as peripheral shelf 204A. Peripheral shelf 204A contains High Speed Line Processing (HLPC) Cards 220, I/O cards 222, High Speed Fabric Interface Cards (HFIC) 218 and accesses two redundant High Speed Shelf Controllers (HSC) cards 224. The second type is a Peripheral Shelf (PS), represented as peripheral shelf 204B. It contains Line Processing Cards 226, I/O cards 222 and Peripheral Fabric Interface Cards 218 and 216. The PFIC are either configured as Dual Fabric Interface Cards (DFIC) or Quad Fabric Interface Cards (QFIC). Peripheral shelf 204B also has access to two shelf controllers 224.

Control shelf 202 comprises an overall pair of redundant control cards, a redundant pair of inter-draft connection (ICON) cards, an ICON—I/O card, a Control Interconnect Card (CIC card) for each control card and a single Facilities Card (FAC card). The ICON card interconnects the control shelf to all peripheral shelf controllers on the other shelves in the system. The FAC provides an interface to provide external clocking for system timing. The CIC provides craft interface to communicate with the control cards.

Figure 2C:
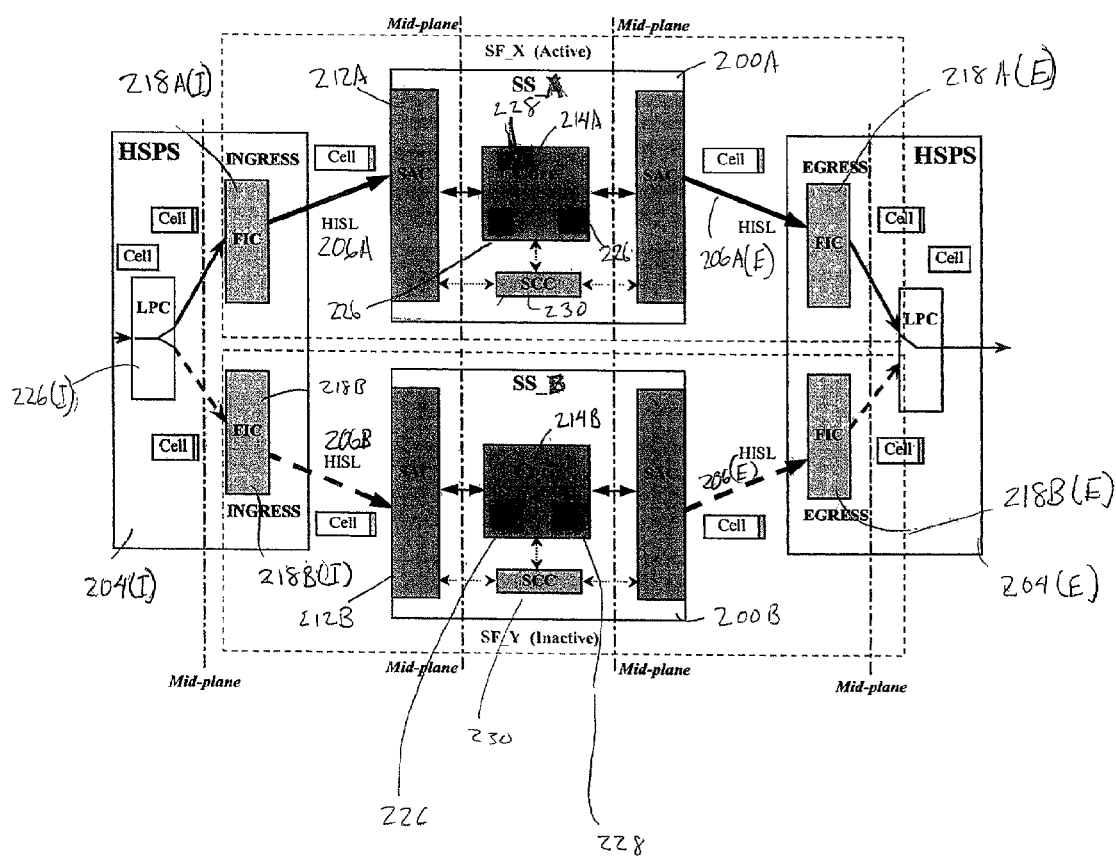
FIG. 2C is a block diagram of traffic flow between components of the switch of FIG. 2B.

FIG. 2C illustrates aspects of the redundant fabrics of switch 108, where the following convention is used for reference numbers. There are two fabrics, A and B. Accordingly all elements associated with fabric A have a suffix A associated with it. Similarly all elements associated with fabric B have a suffix B associated with it. There is an ingress path and an egress path for each fabric. All elements associated related to the ingress path have a further (I) suffix associated with it; all elements related to the egress path have a further (E) suffix associated with it.

Redundant switching shelves 200A and 200B receive data traffic from devices 102a connected to an ingress port of switch 108, process the traffic through their respective fabrics, then forward the traffic in the egress direction to the correct egress port. Any traffic which can be sent on shelf 200A may also be handled by shelf 200B.

For each core 214 of each switching shelf 200, there are 6 switching matrix cards (SMX) 226. Each SMX card 226 provides a selectable output stream for data traffic received through its input stream. The set of the 6 SMX cards 226 constitutes a non-blocking 32×32 HISL core of the switching path fabric for one switching shelf 200. Cell switching both to and from all SAC cards 212 occurs across the 6 SMX cards 226. In the embodiment all 6 SMX cards 226 must be present and configured in order to provide an operational switching core for one switching shelf 200.

Also, each switching core 214 has a Switching Scheduler Card (SCH) 228 which provides centralized arbitration of traffic switching for switching shelf 200 by defining, assigning and processing multiple priorities of arbitration of data traffic processed by the switching fabric of switching shelf 200. Accordingly, the use of the priorities allows switch 108 to offer multiple user-defined quality of service. SCH 228 must be present and configured to constitute an operating switching core.

Switching shelf 200 has a Switching Shelf Controller (SSC) card 230, which provides a centralized unit responsible for configuring, monitoring and maintaining all elements within switching shelf 200. The SSC 230 controls SACs 212, SMXs 226, SCH 228, and an alarm panel (not shown) and fan control module (not shown) of switch 108. It also provides clock signal generation and clock signal distribution to all switching devices within switching shelf 200. Due to its centralized location, SSC 230 is considered to be part of the switching fabric. As a result, any failure in the SSC 230 will trigger a fabric switch. The SSC 230 communicates with the control card 202 via an internal redundant Control Service Link (CSL) 208.

Switch 108 handles redundant datapath switching in the following manner.

Ingress peripheral shelf 204(I) receives ingress data traffic from device 102 at line processing card (LPC) 226(I). LPC 226(I) forwards the same traffic to both fabric interface cards 218A and 218B. FIC 218A is associated with fabric A and shelf 200A. FIC 218B is associated with fabric B and shelf 200B. Accordingly, peripheral shelf 204A provides the traffic substantially simultaneously to both fabric A and fabric B. It will be appreciated that there may be some processing and device switching delay in PS 204(I) preventing absolute simultaneous transmission of traffic to fabrics A and B. It is presumed, for this example, that fabric A is the active fabric and fabric B is the redundant fabric.

From FIC 218A, the traffic is sent over HISL 206A(I) to shelf 200A; from FIC 218B, the redundant traffic is sent over HISL 206B(I) to shelf 200B. In shelf 200A, ingress SACs 212A(I) receive the traffic and forward it to core 214A. The SSC 230 provides clocking and processor control of all elements of the switching shelf. Once the traffic is sent through core 214A, the traffic is sent in the egress direction to egress SACs 212A(E). The appropriate SAC 212A(E) forwards the traffic on a HISL 206A(E) to egress peripheral shelf 204A(E).

At egress, peripheral shelf 204A(E), FIC 218A(E) receives the traffic and forwards it to LPC 226E. LPC 226E then transmits the traffic out of switch 108. It will be appreciated that a similar processing of traffic occurs in shelf 200B for traffic received from ingress FIC 218B(I) over HISL 206B(I).

Note that two streams of traffic are received at egress peripheral shelf 200(E) from fabric A and B at LPC 226(E). Accordingly, LPC 226(E) simply selects from which fabric to receive the traffic based on an analysis of the status of both fabrics. Accordingly, in the event of a detection of a fault on the active fabric, switch 108 may quickly switchover to the redundant fabric without causing a loss of data traffic which has already been initially processed by the active fabric. This is because same traffic has simultaneously been sent through the redundant path.

The system and method relating to the detection of faults in the active and redundant fabric and the evaluation for the need of a switchover is described in remainder of this specification.

3.0 Details of Elements of Switch 108

Referring to FIG. 3, aspects of the fabric fault detection, fabric switchover, multiple fault recovery elements and the interactions between the elements in switch 108 are shown. Switch 108 utilizes various hardware and software elements to control I/O shelf controller 224, switching shelf controller 230 and control complex 202.

For each of I/O shelf controller 224, control complex 202 and switching shelf controller 230, the hardware and software elements are grouped into three related layers. Each layer communicates only with its adjacent layer and each adjacent layer provides an interface and functional abstraction to its neighbour.

The bottom layer is device layer 302. Device layer 302 is the interface to physical elements in switch 108. Software elements in device layer 302 monitor their respective physical elements for any change in status, i.e. errors or clearing of errors, and report the change to the corresponding elements in the next layer, resource layer 304. Accordingly, there is a driver associated locally with each component, namely one for each error which may occur in each of shelf controller 224, control card 202 and SSC 230.

The middle layer is resource layer 304. For each driver, a software module in resource layer 304 receives the raw status data from the drivers in driver layer 302 and processes and forwards the error information to the top layer. As with the components in driver layer 302, a fault detection unit 308 is associated locally with each driver, namely one for each error which may occur in each of shelf controller 224, control card 202 and SSC 230. Fault detection unit 308 receives and processes information from the drivers then sends reports to fault analysis unit 310, which also resides in resource layer 304. Fault analysis unit 310 determines whether the error is a first error in the active fabric, initiates a fabric switchover if it is, and updates the administrative functions in the top layer if it is not.

The top layer is administrative layer 306, which oversees all the administrative functions of the entire switch 108. As this is the central function, only control complex 202 provides functionality in administrative layer 306. Administrative layer 306 receives all processed errors from all modules in resource layer 304 and determines whether a fabric should be switched or not. Fabric selection unit 312 provides an overall "demerit" engine which assesses the health of each fabric at a central location and controls the switchover of fabrics.

It will be appreciated that although each module has been defined and located closely with it appropriate resource layer 304, it is possible to have other embodiments which do not have as tight an association of the fault processing with the physical location of the fault, i.e. processing may be done at one central location.

Further aspects of each of the five features of the switch (introduced earlier) are described in turn.

3.1 Fault Detection Unit 308

Referring to FIG. 3, the fault detection unit 308 resides in the resource layer 304 of each controller. Each fault detection unit 308 monitors faults associated with its controller. Any detected faults are also debounced to eliminate specious error signals. Debouncing signals is analogous to debouncing hardware switching signals. Also, the fault detection unit 308 services the fabric error statistics (FES) and the error analysis and correction (EAC) modules. Fault detection unit 308 also provides device statuses that do not need to be debounced to the fabric analysis unit 310, update the FES every 1 second and maintains an aggregated error log table for query by the EAC.

Figure 4:
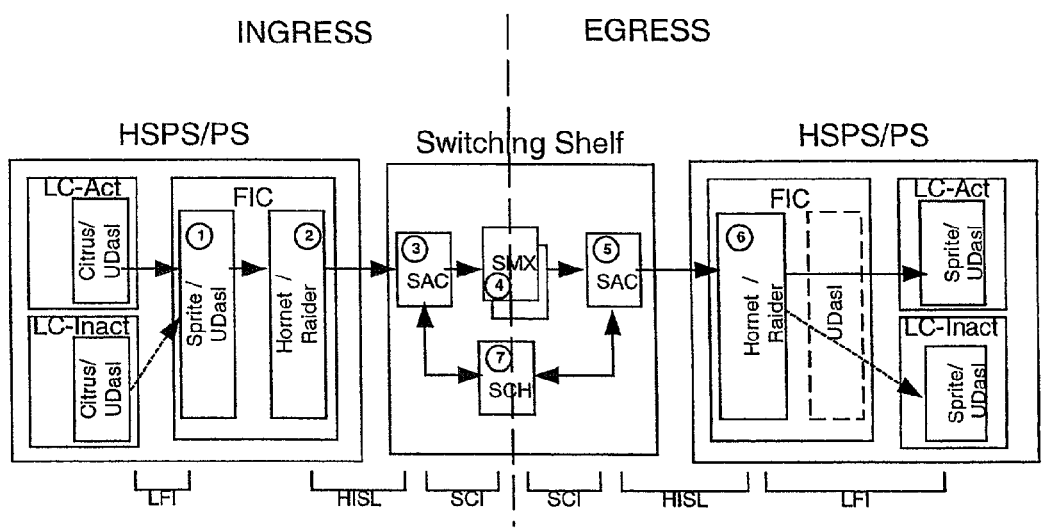
FIG. 4 is a block diagram of error detection locations of fault detection unit of the switch of FIG. 1.

Referring to FIG. 4, in total all fault detection units 308A, 308B and 308C detect and debounce errors at the seven locations numbered one through seven along the fabric datapath. Table A provides a summary of the seven error locations, which are monitored by the various fault detection units 308.

TABLE A

|  | Reside on | Cards to monitor | Error collection points |
|---|---|---|---|
| SSC Fault Detection | SSC | 32 SAC, 6 SMX and 1 SCH | 3, 4, 5, 7 |

TABLE A-continued

|  | Reside on | Cards to monitor | Error collection points |
|---|---|---|---|
| HSC Fault Detection | HSC | 16 HFIC | 1, 2, 6 |
| PSC Fault Detection | PSC | 2 PFIC | 1, 2, 6 |
| CC Fault Detection | CC | 2 PFIC | 1, 2, 6 |

Figure 5:
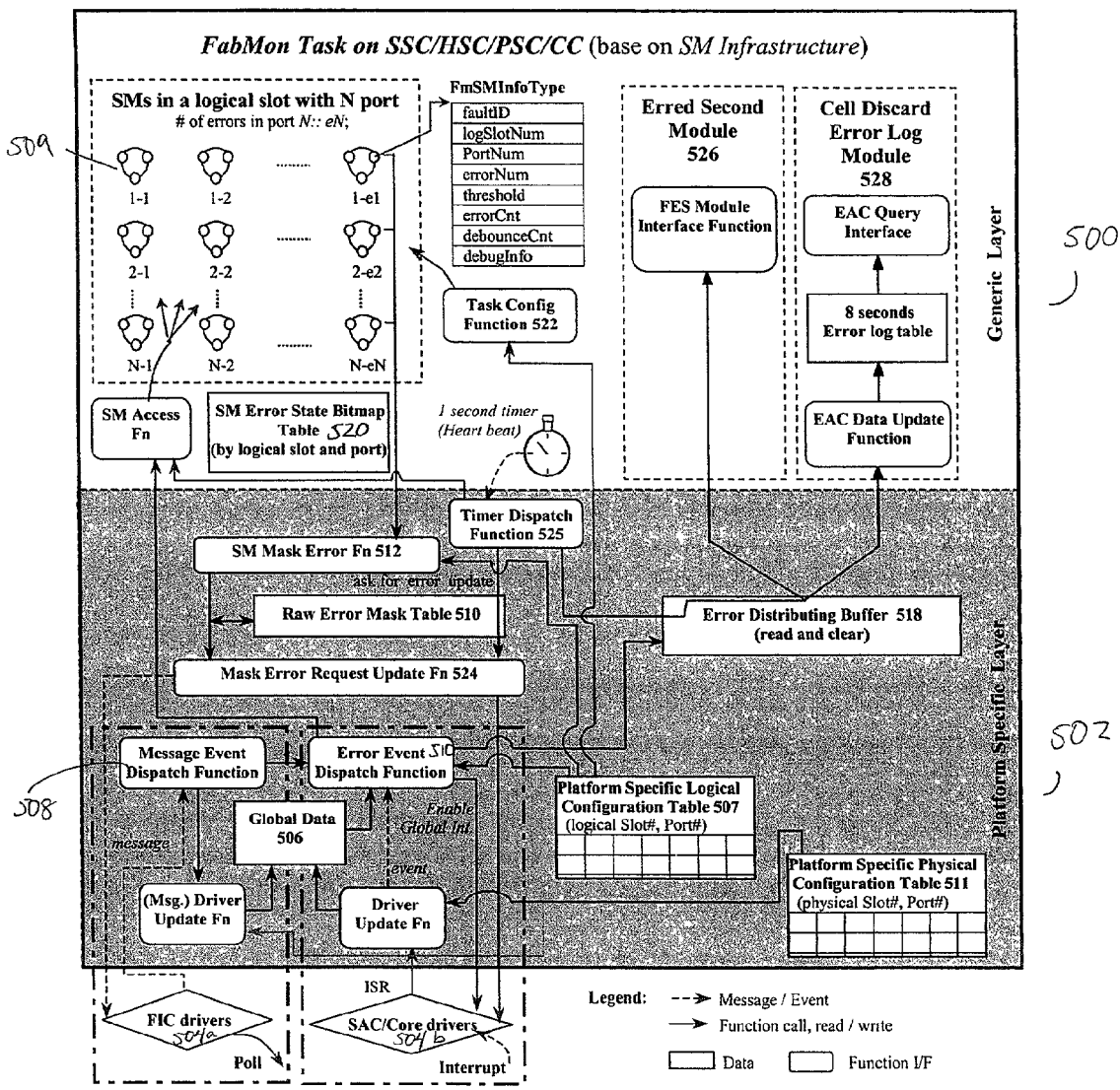
FIG. 5 is a block diagram of the fault detection unit of the switch of FIG. 1.

Referring to FIG. 5, further aspects of a fault detection unit 308 are shown. There are two layers associated with fault detection unit 308. Generic layer 500 contains a series of modules, which are used by each of the various fault detection units 308 in processing error information. Accordingly generic layer 500 can be used by several fault detection units. Platform specific layer 502 includes software and devices which are tailored to detecting and reporting specific errors associated with each of the I/O shelf controller card 224, the controller card 202 and SSC 230.

Errors must be detected by appropriate hardware and software modules in device layer 302, then processed by the fault detection unit 308, which reports the errors to a fault analysis unit 310 for further processing.

All errors are detected by drivers associated with each of the potential failure points for that particular controller. Accordingly, FIC drivers 504a poll the interface cards every 10 ms for any faults in the interface cards. SAC/core drivers 504b are interrupt driven drivers which received interrupt signals from the SAC cards or core systems upon the flagging of an error (or the clearing of an error) for those associated devices. Again, drivers 504a and 504b reside in driver layer 302.

There are three main interface and analysis elements associated with each fault detection unit 308. First, a driver 504 detects and reports an error to the fault detection unit. An error may be physical or logical. A logical error may be aggregated from multiple physical errors on multiple cards; a physical error is an error detected from a driver. The physical errors are mapped to logical errors stored in global data area 506 based on physical error table 511. Next, global data area 506 maintains information about detected logical errors allowing centralized processing of information relating to all logical errors. Global data area 506 is updated by the driver update function in the driver's interrupt service requests (ISRs) context. The error event dispatch function 510 processes the global data 506 by using a logical error table 507 as a lookup which allows error bits in 506 to be identified with logical slot numbers, port numbers and error numbers of the detected error. For interrupt driven driver 504b, upon an error interrupt driver update function is invoked in interrupt context to sets global data 506 and an event is sent to fault detection task. Error event dispatch function is called in fault detection task's context to update the corresponding state machine. For message driven driver, upon detecting an error driver 504a issues a message to message event dispatch function 508, which sets global data 506 for information relating to the error by invoking message driver update function. Dispatch function 508 also invokes error event dispatch function 510 to causes a state machine 509 corresponding to the error to be updated. One state machine 509 is associated with each error and analyses the detected error. Also, each state machine debounces each error signal detected. Further detail on the operation of the state machines is provided later.

To map the driver information to global data 506 the physical slot number and the port number must be provided to physical error table 511 where the n-to-one mapping/aggregating information is stored. In order to check any state machine error or forward status asserted in the global data 506 the logical slot number, the port number and the error number must be used to drive the corresponding state machine in fault detection unit 308.

Also, raw error mask table 513 is provided to enable a one-to-one mapping for masking of all dependent hardware bits from any state machine. Table 513 keeps raw error bit masks for physical registered errors. The table is only updated from the state machine mask error function 512 based on the one-to-n mapping algorithm. After the one-to-n mapped bits are updated, all the non-zero-bit masks are read and written to hardware registers through device driver interfaces.

Error event dispatch function 510 also copies information stored in global data 506 to error distributing buffer 518 which stores information for erred second and error log modules. To update FES module (external) with erred second information, FES module interface function is invoked every second to report the asserted error information in the error distributing buffer 518. An error Id stored in logical error table 507 is used for error identification.

An error log table 516 keeps an aggregated cell—discard error status history for the last eight seconds for every card. The switching core 214 statuses are kept against logical slots for the SAC (slot 1–slot 32). To update the error log table 516, logical errors in the error distributing buffer 518 are aggregated with error log mask stored in logical error table 507.

State machine error state bitmap table 520 provides a central data structure for the error status of all state machines. This provides a single checkpoint to determine which state machines are actually in an error state. For each state machine, its corresponding bit in the bitmap table 520 is used to indicate the error occurance.

There are also several functions defined in fault detection unit 308, which are used by the software controlling the system. They are described below.

First, task configuration function 522 initialises the state machine offset ID table, configures the state machines, initialises the state machine error state bit map table 520 and sets up logical error table 507 and physical error table 506.

Second, timer dispatch function 525 requests an update of all the masked errors according to the raw error mask table 513 and drives every state machine in either its persistent error state or intermittent error state for error clearing, pushes up error data in error distributing buffer 518 to both cell discard error log module 528 and error second module 526 through appropriate interfaces, and requests error update from driver for all the masked errors.

Third, state machine mask error function 512 updates the raw error mask table 513 for individual state machines. The interrupt is masked (disabled) when the state machine is in the "NR" state and "PE" state (described later). The function applies a 1-to-N mapping to logical errors of the state machines. It also invokes a mask error request update function 524 to send the affected entries of the bit mask to the appropriate device drivers.

Fourth, mask error request update function 524 provides a common interface to both event driven drivers and message driven drivers. The function is invoked from both the state machine mask error function 512 for an individual state machine and timer dispatch function 522 for updating masked errors once per second. Message event dispatch functions 508 and error event dispatch functions 510 provide the entry point of handling error messages and events through the state machines.

Fifth, error event dispatch function 510 retrieves logical error bits from global date area 506, updates error distributing buffers and drives affected state machines. In the embodiment, it is provided on both interrupt-driven and message-driven platforms. For message-driven platforms, it is invoked by an error message handler which is called by a message event dispatch function. A message event dispatch function provides an entry point for all messages sent to the fault detection task. Different messages are processed by corresponding message handler functions.

Accordingly, it will be appreciated that fault detection unit 308 provides a centralised and flexible system for detecting faults from a variety of error locations. In particular, modifications to the errors reported can be easily made by adding new drivers to detect the errors, updating the global physical error table 511 and logical error table 507 to properly identify and categorise the new fault against the appropriate slot and port and adding a new state machine to process the error message generated by the new driver.

3.1.1 State Machines 509

Figure 6A:
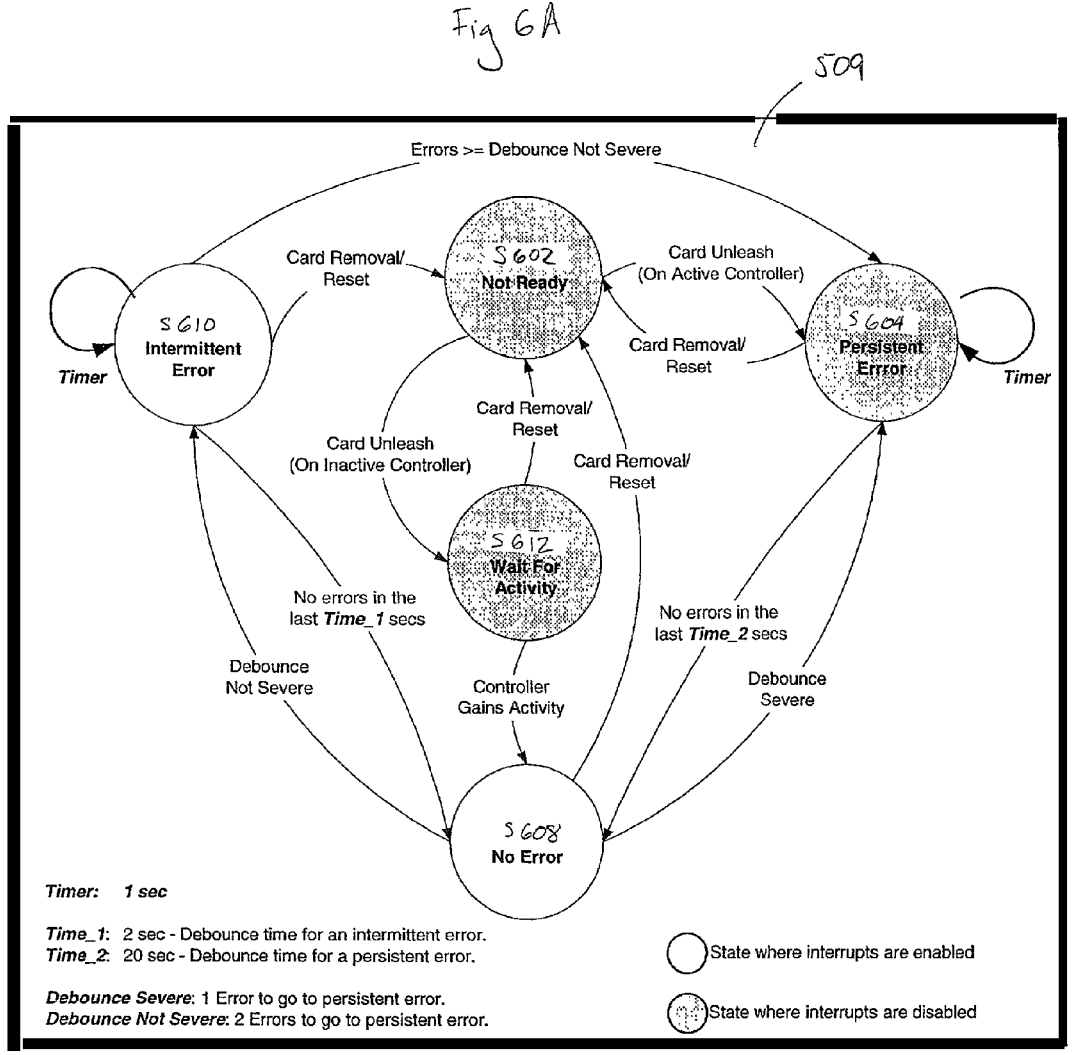
FIG. 6A is a block diagram of a state machine of a fault detection unit of the switch of FIG. 5.

Referring to FIG. 6, mechanics of state machine 509 are shown. As a typical state diagram, state machine 509 exists in one of several states, with states transitioning between each other upon receiving stimuli. States are represented by circles, stimuli are represented by arrows.

As noted above, a state machine is provided for each type of error and each port and slot. Accordingly, the total number of state machines for each controller in switch 108 is the sum of the number of slots, ports per slot plus the errors per port. Each state machine has a header describing the error identification, the location of the error and the debouncing threshold. The slot defined in the header is the logical slot number and the slot number defined in the state machine data type is the physical slot number which it is checked against at the card reset/removal and card unleash.

Table B provides a summary of events and transitions between states shown in FIG. 6. When an event occurs, each state may test for certain predicates "Pn" before performing an action "An" and moving to another state "Sn".

TABLE B

| | | State Initial State is S1 | | | |
|---|---|---|---|---|---|
| Event | S 602 NR Not Ready | S 604 PE Persistent Error | S 608 NE No Error | S 610 IE Intermittent Error | S 612 WA Wait For Activity |
| E1—Card Unleash | P5:A1→S604 !P5:→S612 | | | | |
| E2—Card Not Unleashed | →S 612 | A2→S 602 | A2→S 602 | A2→S 602 | A2→S 602 |
| E3—Global Heartbeat Timer Expiry | | P4:A5→S 604 !P4 & P2: A3→S 608 !P4 & !P2: A4→S 604 | | P1:A8→S 608 !P1:A4→S4 | |
| E4—Error | | A5→S 604 | P3: A6A7→S 604 !P3: A5A7→S 610 | P3:A6→S 604 !P3:A5→S 610 | |
| E5—Gain Activity | | | | | A9→S 608 |

Following is a description of the states and events in FIG. 6. Not Ready (NR) state 602 is the initial state of system 600 and indicates that a card is not unleashed. NR state 602 may exit to Persistent Error (PE) state 604 or Wait for Activity (WA) state 612 depending on whether state machine 509 is running on an active controller.

When operating on an active controller, PE state 604 is entered upon a card being unleashed. This ensures that system 600 has reached stability as the card or entire system is coming on line. PE state 604 provides a period of 20 seconds before clearing any errors. Also, the fault analysis unit begins to assess fabric demerit values after a "grace period" at system start-up.

PE state 604 is entered from one of three states:
1. From NR state 602 when a card is unleashed;
2. From Intermittent Error (IE) state 610 when the number of errors detected while in IE state 610 is greater than the DebounceNotSevere threshold before a first time interval expires; or
3. From No Error (NE) state 608 when the system detects an error that has a threshold value of DebounceSevere.

First and second time intervals are tracked by a counter, which is incremented each time a global timer expires.

"Debounce severe" and "debounce not severe" are thresholds for the number of errors detected before an error is determined to be persistent. Some errors may be transitioned from NE state 608 to PE state 604 while others may be debounced before being transitioned to the PE state 604.

In PE state 604, device level interrupts for the error are disabled. State machine 509 stays in PE state 604 when errors are detected before the expiration of the second time interval. Otherwise, state machine 509 transitions to NE state 608 upon the expiration of the second time interval. When state machine 509 is in NE state 608, after an error is detected, state machine 509 moves to either IE state 610 or PE state 604, depending on whether the error is set to DebounceNotSevere or DebounceSevere.

In IE state 610, state machine 509 transitions to PE state 604 when errors exceed the DebounceNotSevere threshold before the expiration of the first time interval. Otherwise, state machine 509 transitions to NE state 608 upon the expiration of the first interval.

Waiting for Activity (WA) state 612 is entered when a card is unleashed and state machine 509 is running on an inactive shelf controller.

As all state machine instances share a global heartbeat timer, for those state machine instances that are not in error states (NR state 602, NE state 608 and WA state 612), the global timer is ignored. In the embodiment the heartbeat timer is 1 second. Each time the global heartbeat timer expires, the heartbeat timer dispatch function has three actions. First, it drives state machines 509 which correspond to all errors that have a bit set in the state machine raw error mask status table 510. Error clearance is tracked with the error clearing counter. Second, it passes error data in the error distributing buffer 518 to both erred second module 526 and error log module 528. Third, it triggers an update of all errors whose bits are set in the state machine raw error mask status table 510.

3.1.2 Error Types

Referring to Table C, following is an example of the physical register errors and logical errors tracked in the embodiment. As noted earlier, SSC 232 handles all 32 ports on all 32 SACs 208. In a switching shelf 200A, there are 32 SACs 208, one SCH 230 and 6 SMX cards 228. The fault detection unit 308 relays other physical status such as "line card to OOB magic packet". Errors in physical slots 33–39 for SCH 230 and SMX 236) are mapped to physical slots 1–32 (for SAC). Accordingly, 32 logical slots exist that contain errors relating to physical slots 33–39.

TABLE C

| Logical Slot Num | Error Name/Fault ID | Drop Cell | Threshold | Physical Device/Card | Physical Slot Num | Description |
|---|---|---|---|---|---|---|
| 1–32 | CRC on Ingress SCH SCI | ✓ | 1 | SCH | 33 | Ingress SCH SCI |
|  | CRC on Ingress SMX SCI 1 | ✓ | 2 | Xbar 1, 2/SMX | 34 | Ingress SMX SCI 1 |
|  | CRC on Ingress SMX SCI 2 | ✓ | 2 | Xbar 1, 2/SMX | 35 | Ingress SMX SCI 2 |
|  | CRC on Ingress SMX SCI 3 | ✓ | 2 | Xbar 1, 2/SMX | 36 | Ingress SMX SCI 3 |
|  | CRC on Ingress SMX SCI 4 | ✓ | 2 | Xbar 1, 2/SMX | 37 | Ingress SMX SCI 4 |
|  | CRC on Ingress SMX SCI 5 | ✓ | 2 | Xbar 1, 2/SMX | 38 | Ingress SMX SCI 5 |
|  | CRC on Ingress SMX SCI 6 | ✓ | 2 | Xbar 1, 2/SMX | 39 | Ingress SMX SCI 6 |
|  | SCH SCI link down | ✓ | 1 | Port Processo-SCH | 33 | SCH SCI |
|  | SMX SCI 1 link down | ✓ | 1 | Dataslice 1, 7 - xbar1, 2 | 34 | SMX SCI 1 |
|  | SMX SCI 2 link down | ✓ | 1 | Dataslice 3, 9 - xbar1, 2 | 35 | SMX SCI 2 |
|  | SMX SCI 3 link down | ✓ | 1 | Dataslice 5, 11 - xbar1, 2 | 36 | SMX SCI 3 |
|  | SMX SCI 4 link down | ✓ | 1 | Dataslice 2, 8 - xbar1, 2 | 37 | SMX SCI 4 |
|  | SMX SCI 5 link down | ✓ | 1 | Dataslice 4, 10 - xbar1, 2 | 38 | SMX SCI 5 |
|  | SMX SCI 6 link down | ✓ | 1 | Dataslice 6, 12 - xbar1, 2 | 39 | SMX SCI 6 |
|  | Magic Packet CRC |  | 1 | Port Processor/SAC | 1–32 | Ingress FI port |
|  | Grant Empty Queue | ✓ | 1 | Port Processor/SAC |  | Ingress FI port |

In the embodiment, each fault detection unit is implemented in software which operates on a processor associated with each respective shelf. The software is implemented in C.

3.1.3 Driver Interfaces

An interrupt-driven driver and a message-driven driver are two kinds of drivers implemented in the embodiment.

Referring to FIG. 5, for any switching shelf error, an event is sent from the interrupt-driven driver ISR to the fault detection unit 308 by invoking the driver update function. Three parameters are provided with the function, namely a pointer to a data structure containing the detected register error bits, the identity of the device that detected the error and the slot number. The ISR can service multiple interrupts generated by multiple devices in the same slot. All the device interrupt registered is checked and the corresponding global data entries are updated. The driver masks the global interrupt for all drivers before invoking the driver update function to send the event to the fault detection unit.

Fault detection unit error event dispatch function 510 checks the global data 506 and drives the state machines corresponding to the errors. At the end of the dispatch function the global interrupt is unmasked.

Errors which occur on interface cards are detected by message-driven drivers. A fault detection unit is provided for message-driven errors. On each interface card there are multiple ports which comprise various devices. There are up to 20 logical ports for an interface cards. When fault detection unit receives an error message relating to one of the devices, it updates the global data 506 through a message driver update function and invokes error event dispatch function 510, with the interrupt-driven fault detection unit.

3.1.4 Initialization of Fault Detection Unit 308

Following is a description of the initialization of fault detection unit 308. At start-up, all state machines on the different shelves are initialized. The initial state of all state machines is "not ready". The interrupts for all devices are disabled in the initial states.

Upon the detection of an error, the driver's ISR masks the error interrupt and invokes the driver update function. The driver update function performs the following steps:

1. An N-to-1 mapping of the reported errors to the global data area in accordance with the mapping information contained in physical error table 511. In the global data area 506, the slot bitmap field which indexes the current update and other flags to indicate the error and status updates are properly set.
2. An error event is sent to the fault detection unit for notifying the availability of the logical errors in the global data area.

Upon receiving the error event, fault detection unit 308 will invoke the error event dispatch function to handle the error information in the global data area. Depending on the indexing slot bitmap field in the global data area, the error event dispatch function reports the fabric status to the fault analysis unit without going through a state machine. Also, the error event dispatch function OR's the state machine error bitmap onto the corresponding entry in the error-distributing buffer. After all the state machine corresponding to the set bits are accessed, the function clears all the fields of the entry.

3.1.5 Description of Error Tables and Error Mapping Algorithms

All the operation and algorithm in the fault detection unit 308 are based on the definitions of physical error table 511 and logical error table 507. Physical error table provides information for mapping physical error into logical error and logical error table contains information for mapping logical error back into physical error.

Referring to FIG. 6B, physical error table 511 and logical error table 507 are 2 dimensional arrays indexed by slot number and port number in physical error domain and logical error domain, respectively.

Physical error table entry 614 contains a field 616 for number of physical registers and a pointer to the physical register description array 618. Each entry of the physical register description array keeps a field 620 for number of error on the register and a pointer to the physical error description array 622. Each entry of physical error description array stores all the necessary n-to-1 mapping information such as destination logical slot number and port number, error bit mask for physical error, the error bit mask for mapping the bit into global data area 506, etc.

Logical error table entry 624 contains a field 626 for number of logical errors and a pointer to the logical error description array 628. Each entry of the logical error description array keeps a field 630 for logical error ID, a field 632 for error threshold corresponding state machine, a field 634 for number of physical error dependency, and a pointer to the physical error dependency array 636. Therefore, relationship of one logical error to multiple physical error can be described. The content of each entry of physical error dependency array provides all the necessary information to map logical error back to physical error for interrupt masking purpose. It contains original physical slot number and port number, physical register number, and physical error mask.

There is an N-to-1 mapping from physical error domain to logical error domain according to physical error table 511 setup. The following N-to-1 mapping algorithm is used for mapping fault information from device drivers into logical error.

For each error on each physical register defined in Physical Error Description Table and Physical Register Description Table

```
Get logical slot number from logSlotNum field in Physical Error Description Table entry
If (logical slot number is non-zero), then
    /*the error on the register needs to be cross-slot mapped*/
    target logical slot number = logical slot number;
    If (physSlotNum-eFirstSmxSlotNum>=0), then
        target logical error bit (position) is set according to the bitmask getting from the left-shelf
        (physSlotNum-eFirstSmxSlotNum)bits of mappingMask field defined in Physical Error
        Description Table entry
    Otherwise
        target logical error bit (position) is set according to the mappingMask field defined in
        Physical Error Description Table entry.
otherwise
    target logical slot number = physical slot number;
    target logical error bit (position) is set according to the mappingMask field defined in Physical
    Error Description Static Table entry.
target logical port number = physical port number;/* usually, no cross port mapping is needed */
```

There is a 1-to-N mapping from logical error domain to physical error domain according to logical error table 507 setup. The following 1-to-N mapping algorithm is used for mapping logical error into interrupt register data for drivers.

For each logical error entry defined in Logical Error Description Table

```
For each entry of Physical Error Dependency Array pointed by the logical error entry
    If the logical error is cross-slot mapped from a different slot (i.e origPhySlotNum!=0), then
            physical slot number = original physical slot number;
        otherwise
            physical slot number = logical slot number;
    The physical port number equals to the logical port number;
    The physical register number equals to the physRegNum field of the Physical Error Dependency
    Array entry;
    The phyErrMask field of the Physical Error Dependency Array entry is applied to the physical
    register buffer (such as in Raw Error Mask Table) identified by physical slot number, port number
    and register number.
```

3.2 Fault Analysis Unit 310

Fault analysis unit 310 receives fabric status updates from a variety of sources; however, the primary source is fault detection unit 308. On reception of fabric status updates, fault analysis unit 310 advises the master fabric selection unit 312 whether demerits should be increased or decreased for specific fabric components. The amount by which the demerits are adjusted is determined in fabric selection unit 312. Also, fault analysis unit 310 updates the fabric health through CSL 208 and calls the registered functions on reception of fabric status updates. Fault analysis unit 310 runs at the same priority as the fault detection unit so that context switches are kept to a minimum. Fault detection unit 308 calls fault analysis unit 310 directly.

In the embodiment, fault analysis unit 310 also operates in software on the same processor handling the fault detection unit software. It will be appreciated that it may operate on another location in switch 108. The fault analysis unit software is implemented in C.

Figure 7:
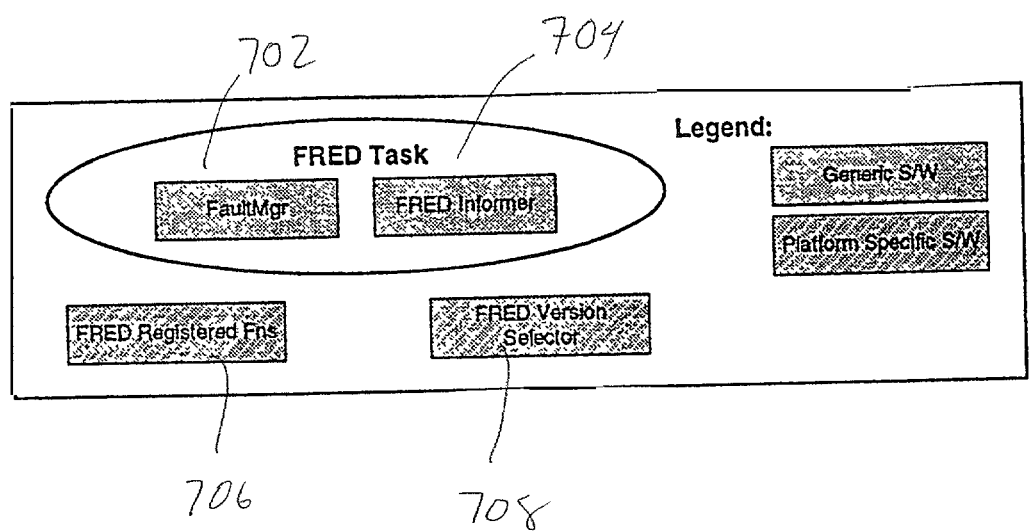
FIG. 7 is a block diagram of a fault analysis unit of the switch of FIG. 1.

Referring to FIG. 7, there are four components related to fault analysis unit 310: Fault manager 702, informer 704, registered functions module 706, and version selector 708. Each is described in turn.

The main task of fault manager 702 is to activate the mechanism to fast switch a fabric from the active fabric to the redundant fabric when an initial fault is detected. Fault analysis unit 310 initiates a switch via the E1 signalling link on the CSL 208 through an internal fault manager function which determines whether the fabrics it is responsible for are healthy or not. By setting the fabric health on the CSL 208, a fast fabric switchover may occur. However, fabric selection unit 312 which controls the fabric determination circuit master controller is ultimately in control of whether the fast fabric switchovers are engaged or not. Fast fabric switchovers are automatically disabled when an initial fabric fault is found by updating the fabric activity circuit through CSL 208. Updating the fabric activity determination circuit may result in a fast fabric switchover if the system was faultless and the fabric that the fault was detected on was the active fabric at the time. Fast switchovers are automatically re-enabled by the fabric selection unit 312 when all fabric faults are cleared. Accordingly, this prevents multiple fault analysis units from performing a fast switchover. There is a time priority value associated with a switchover and the first shelf reporting an error will have its request for a switchover granted. The second job of fault manager 702 is to initiate registered functions 706. Registered functions 706 are required when a "special case" operation must be performed upon receipt of a specific fault. These registered functions may be initialized at system startup or at run time, as different fabric options are configured and the system changes. This gives the fault manager 702 the ability to change its behaviour dynamically.

Fault manager 702 also groups faults from the various subsystems into categories and provides them to the informer 704 for demeriting.

Figure 8:
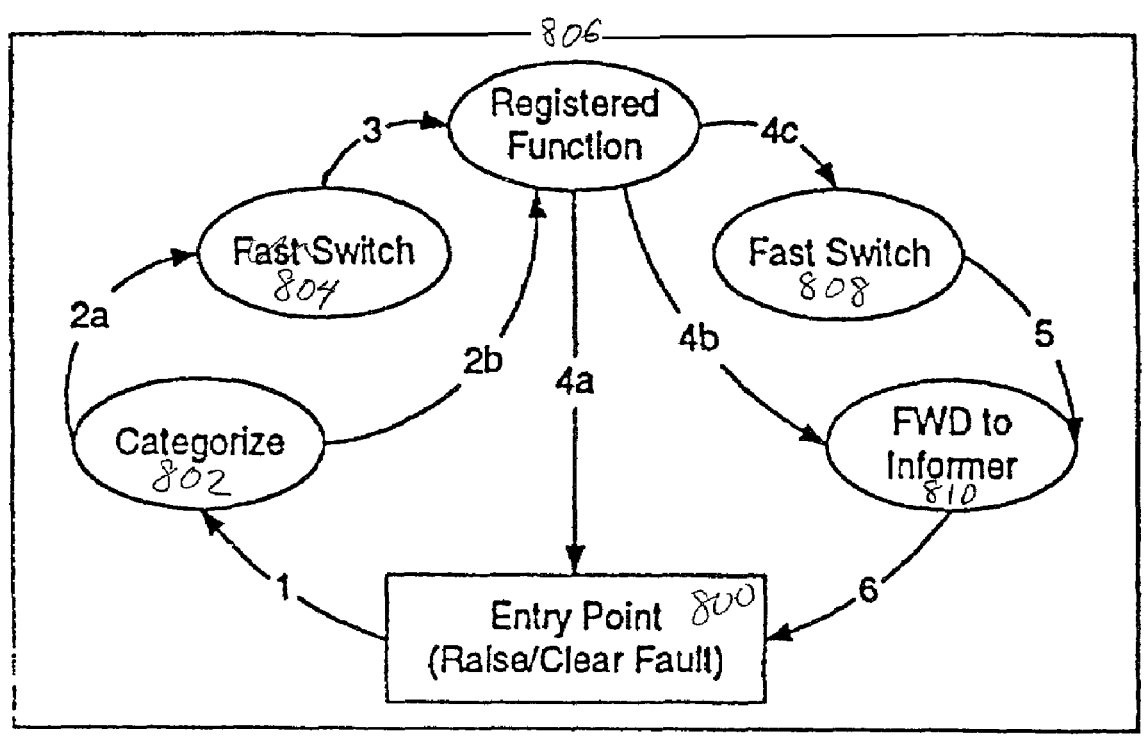
FIG. 8 is a block diagram of a state machine of the fault analysis unit of FIG. 7.

Referring to FIG. 8, following is a description of the operation of fault manager 702. First, at entry point 800, a fault is received and is categorized into one of several categories.

The demerit field of the "reference table" is examined to determine whether the fault may initiate a switchover. This occurs in the categorizing stage 802. If the field indicates that it may, then the switch function 804 is called. Accordingly, a switchover from an active fabric to a redundant fabric can be initiated here. In the embodiment, the switchover signal ultimately controls which fabric that LPC 226(E) selects. If the field is set to false, the switch function 804 is not called. Next, fault manager 702 calls a registered function 806 relating to the fault which is being raised or cleared per step 806. The result of registered function 806 is evaluated. If the return value is false, then the fault is not demeritable and the processing of the fault stops. If the registered function returns true and the switch function was called, then the fault manager advises informer 704 whether to raise or clear the fault. If the function returns true and a switchover was not performed then the fault manager calls the switch function per step 808. Next, informer 704 is told whether the fault is raised or cleared, then it sends a message to the multi-shelf fabric in case the fabric selection unit must be updated per step 810. At this point, the processing is complete and fault manager 702 returns to state 800.

For fault handling, fault analysis unit 310 receives its fabric information primarily from fault detection unit 308 every time a fault enters or leaves PE state 604. Faults may be declared by any other subsystem capable of detecting fabric problems. A system-wide reference table is used to determine how to process various faults, which is incorporated into fault manager 702. The table is indexed by a fault id and its fields are as follows:

1. Category: The fault manager group falls into categories of locations of errors so that the multi shelf fabric may determine what is being demerited. These categories are card, shelf, core, ingress port and egress port.
2. Demerit: This Boolean field determines whether the fault is demeritable and is given to informer 704 for sending to the fabric selection unit for demeriting. When the field is set to false, the fault analysis unit must utilize the registered function to make the final determination. If the registered function returns a "true" value, then the fault may be demerited and the fault is switching eligible.
3. Registered function: This field is a pointer to a function that is called when the corresponding fault is encountered. The function returns a Boolean value indicating whether the fault is to be considered as demeritable or not.

For handling registered functions, tasks may need to have special case actions performed when a specific fault is detected or cleared. The registered function module is used to provide the special case actions. To call the registered function, the slot ID, the port number and the fault ID must be provided. The registered function returns a Boolean value indicating whether the fault must be demerited and if the fault is fast switch eligible. If a fault is demeritable, it is also fast switch eligible. Typically registered functions return a false value and set global data or send an event message to a task. A registered function may also correlate certain faults with other information to determine whether a fault must be demerited and is eligible to be switched.

Fabric selection unit 312 can block any individual shelf controller's fault manager 702 from affecting the fabric activity when it updates the fabric health on CSL 208 by imposing a fabric override on the fabric determination circuit because is the only entity that has a complete tally of all fabric faults.

On all platforms except the switching shelves, fault manager 702 must determine whether it should update the fabric health for A or B. The faulty fabric is determined using the FIC slot ID number where the odd FIC slots are assigned to fabric A and even FICs are assigned to fabric B. When there are no demerits in the system, the switch mechanism is enabled by control complex 202 giving control of the fabric selection to the fault analysis units 310 on the shelf controllers. Subsequent faults are dealt with using the demerit engine, which override the circuit fabric selection output. When all faults are cleared, the multi-shelf fabric allows fabric switching to occur again.

Fault manager 702 also provides categorized fault information to informer 704 which sends this information, if necessary, to the fabric selection unit for demeriting. Informer 704 provides the following functions:

1. Determines when a demerit should be raised or cleared. A fault counter for each demeritable entity is maintained. When the fault counter goes from 1 to 0, the demerits are cleared by sending a message to the multi-shelf fabric module. When the fault count goes from 0 to 1, demerits are raised and a message is sent to the multi-shelf fabric module. The fault counters are adjusted each time a fault is detected or cleared. When a fault is detected, the counter is incremented and when it clears the counter is decremented.
2. Refresh operations, triggered when the CSL connectivity is recovered or when a controller becomes active.
3. Tracks a corresponding FI link to determine whether it is enabled or disabled. Fast switching and demerit switching are disable for a port when its corresponding FI link is disabled. Faults for disabled ports are still tracked but they are not utilized in the demerit engine and do not affect the fabric health as long as they are disabled.
4. Tracks whether a card is unleashed or not. This determines whether a card and its components should be demerited. For example, a card removal or reset indication should be demerited only if the card was unleashed. This information is maintained along with the fault counters in the informer's state table.

The version selector 708 ensures that there is a consistent functional interface to the fault analysis subsystem whether it is the 50 Gbps or 450 Gbps specific subsystem. The module permits use of the same function names and interfaces for the versions of the fault analysis unit.

3.3 Fabric Selection Unit 312

The fabric selection unit 312 receives fabric fault information for fabrics A and B from the fault analysis units on all I/O shelf controllers, the message processor of the control complex and the switching shelf. The fabric selection unit utilises a "demerit engine" to store and calculate demerits for the faults. Each time the fabric selection unit receives fault information it is recorded into the demerit engine; the demerit engine is then queried for the updated demerit count. If the demerit count has changed, the fabric selection unit determines whether a demerit switch can occur and if it is required, also it determines if FAST, where "FAST" is an acronym for Fast Activity SwiTch, should be enabled or disabled. FAST is disabled when the demerit counts for fabrics A or B are not zero and enabled when the demerit counts for both fabrics is zero.

Fabric selection unit 312 handles the following tasks:
1. Processing network management requests for forced switches, user switches, report the active fabric and provide fabric status information;
2. Updating the demerit engine data structure when faults occur with updates received from the fault analysis units;
3. DEMERIT switching;
4. Enabling or disabling FAST fabric switching;
5. Raising and clearing fabric-related alarms;
6. Notify fabric analysis units when a switching fabric related card is operational;
7. Provide fabric selection lockouts and grace periods preventing switchovers.

Figure 9A:
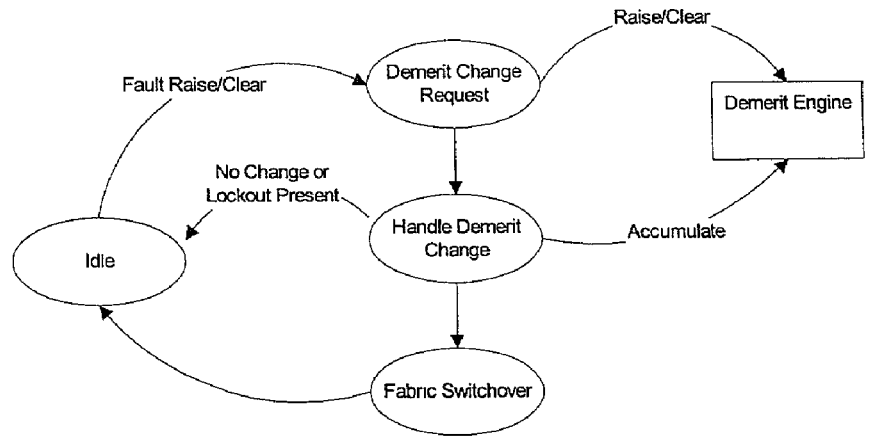
FIG. 9A is a block diagram of a state machine of the fabric selection unit of the switch of FIG. 1.
Figure 9B:
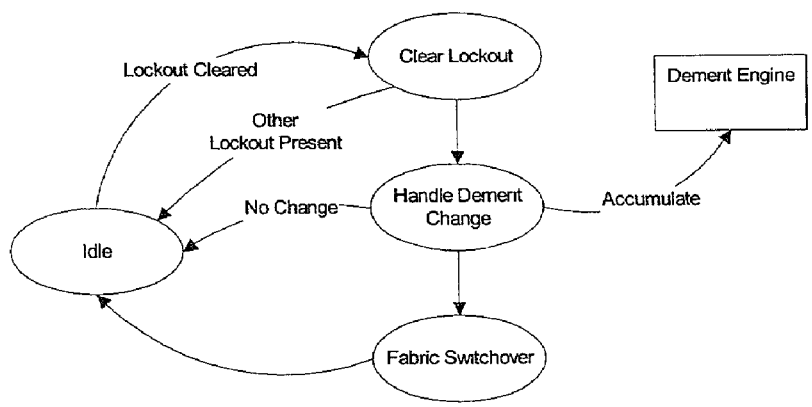
FIG. 9B is a block diagram of another state machine of a fabric selection unit of the switch of FIG. 1.
Figure 9C:
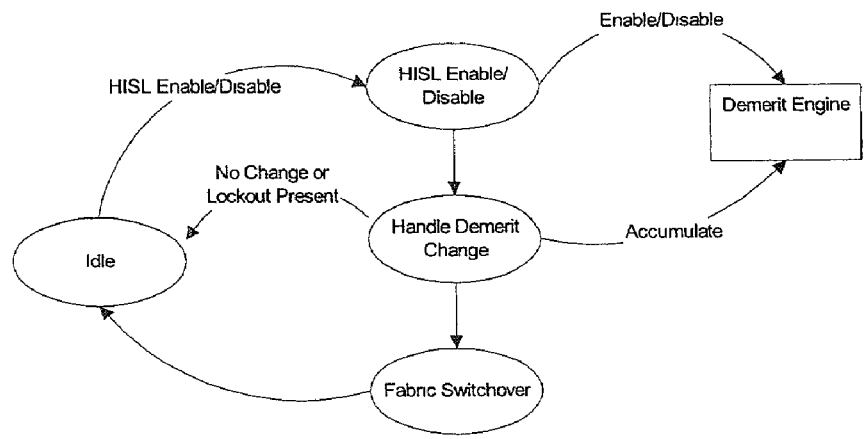
FIG. 9C is a block diagram of another state machine of the fabric selection unit of the switch of FIG. 1.
Figure 9D:
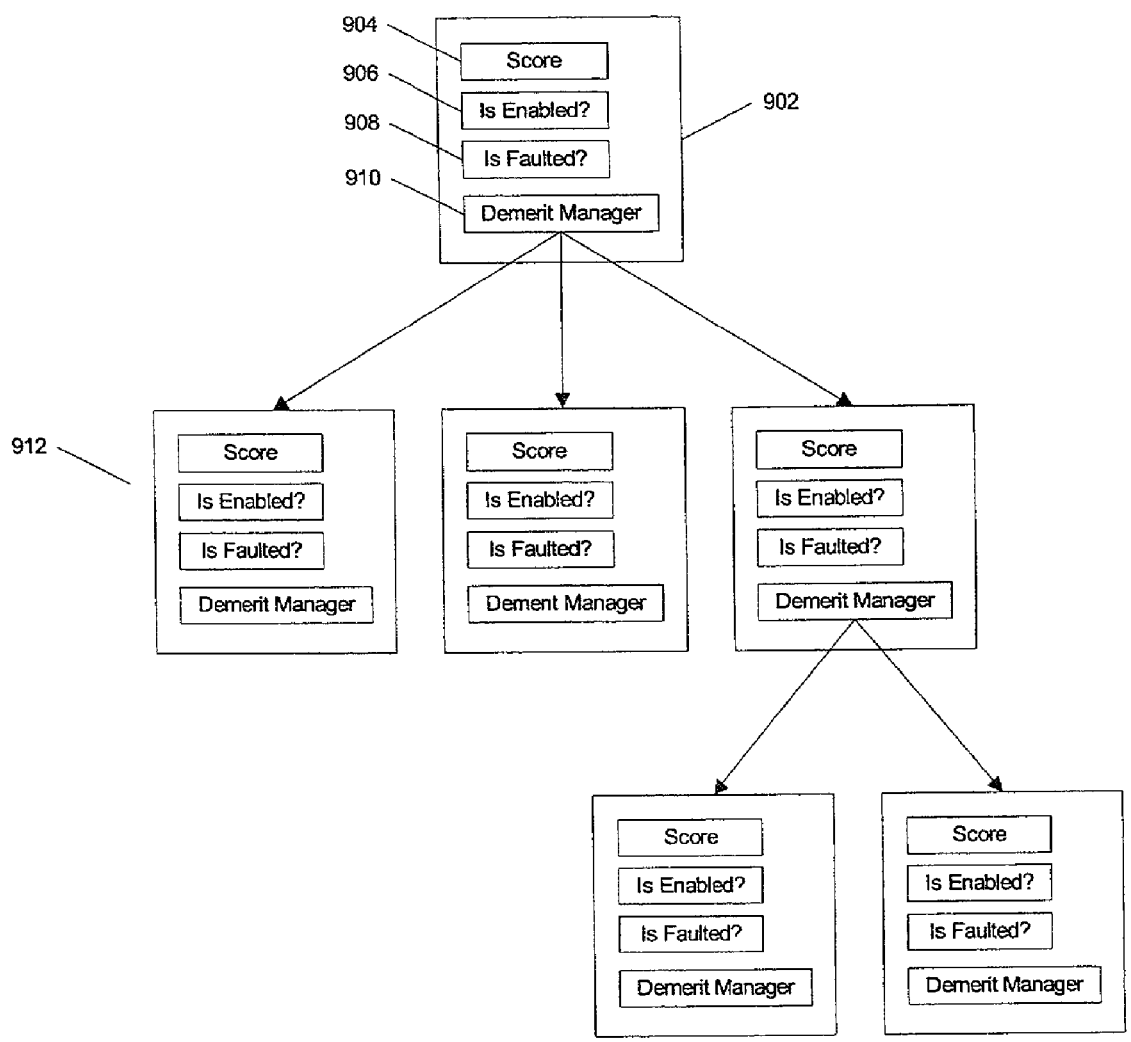
FIG. 9D is a block diagram of another state machine of the fabric selection unit of the switch of FIG. 1.

Referring to FIGS. 9A, 9B, and 9C, the fabric selection unit will execute a demerit based switchover in the following three scenarios.

FIG. 9A illustrates what happens when a fault is raised/cleared by the fabric selection unit. The fabric selection unit is notified of a fault change and the fault information is stored in the demerit engine. The next step is to verify if a fabric lockout is not present in order to continue. A lockout is a mechanism used to block fabric switchovers if certain conditions are present, which would override the demerit count. If lockouts are not present the fabric selection unit will get the demerit counts of Fabric A and B from the demerit engine. If they are not equal and the fabric with the lower score is not presently active, a switchover will occur.

FIG. 9B illustrates the effect of a fabric lockout being cleared. When the fabric selection unit receives a lockout clear, it will verify if other lockouts are present in order to continue. If no other lockouts are present the demerit counts of Fabric A and B are calculated from the demerit engine. If they are not equal and the fabric with the lower score is not presently active, a switchover will occur.

FIG. 9C illustrates the steps taken when a HISL is enabled or disabled. When the fabric selection unit receives a HISL enable/disable it will apply the administrative change to all demerit objects for that link. When a HISL is disabled the demerit engine ignores demerit counts for all components of that link, if it is enabled the demerit counts for that HISL can be accumulated as part of the fabric's health. Once the administrative change occurs and lockouts are not present the fabric selection unit will get the demerit counts of fabrics A and B from the demerit engine. Again, if they are not equal and the fabric with the lower score is not presently active, a switchover will occur.

Referring to FIG. 9, in order to track the health of the fabrics, a demerit engine data structure is used, which tracks demerit values 904 for faults that are raised or cleared 908 for each fabric. The demerit engine data structure comprises of demerit managers 910 and demerit objects 902. Two data structures maintain demerit scores for switching fabrics A and B independently. The demerit engine is responsible for providing an organized demerit system for all fabric components. The demerit engine also provides an overall demerit count representing the health of a fabric utilizing an algorithm based on priorities to resolve cases where certain demerits are suppressed. The demerit engine is embodied in software which executes on a processor on the control complex shelf. In the embodiment, the demerit engine software is implemented in C++.

The data structure is dynamically assembled as application module objects logically representing the switching fabric are created (i.e. a SAC as configured). As these application modules are configured, a demerit object is added to the demerit engine. The demerit engine organises the demerit objects on a hierarchical basis. When given a new demerit object, it will determine where in the hierarchy it belongs and insert it into a demerit manager. A demerit object contains the fault information while the demerit manager contains a list of lower level demerit objects. The demerit manager implements the functionality required to manage a list containing demerit objects, i.e. adding and removing objects, as well as commands which need to be applied to the elements contained in the list, such as accumulating demerit counts.

The fabric selection unit may determine which fabric is healthier by querying demerit engines of fabrics A and B for a demerit count. For the embodiment, the lower of the two demerit counts is deemed to be the healthier switching fabric. Hierarchies for the demerit engine data structure are as follows:
1. Switching shelf (highest)
2. Switching core
3. Card
4. Ingress FI Port/Egress FI Port (lowest)

The demerit engine is sorted on a hierarchical basis to allow an efficient way to suppress lower level demerits. Demerit suppression is necessary for the following cases:
1. When a demerit object is flagged as faulted, demerits contained in its demerit manager are not calculated as part of the fabric's demerit count. Otherwise the contained demerit manager sums the demerit count.
2. When a demerit is flagged as disabled, its demerit count as well as the demerit count of its demerit manager are ignored.

Figure 10:
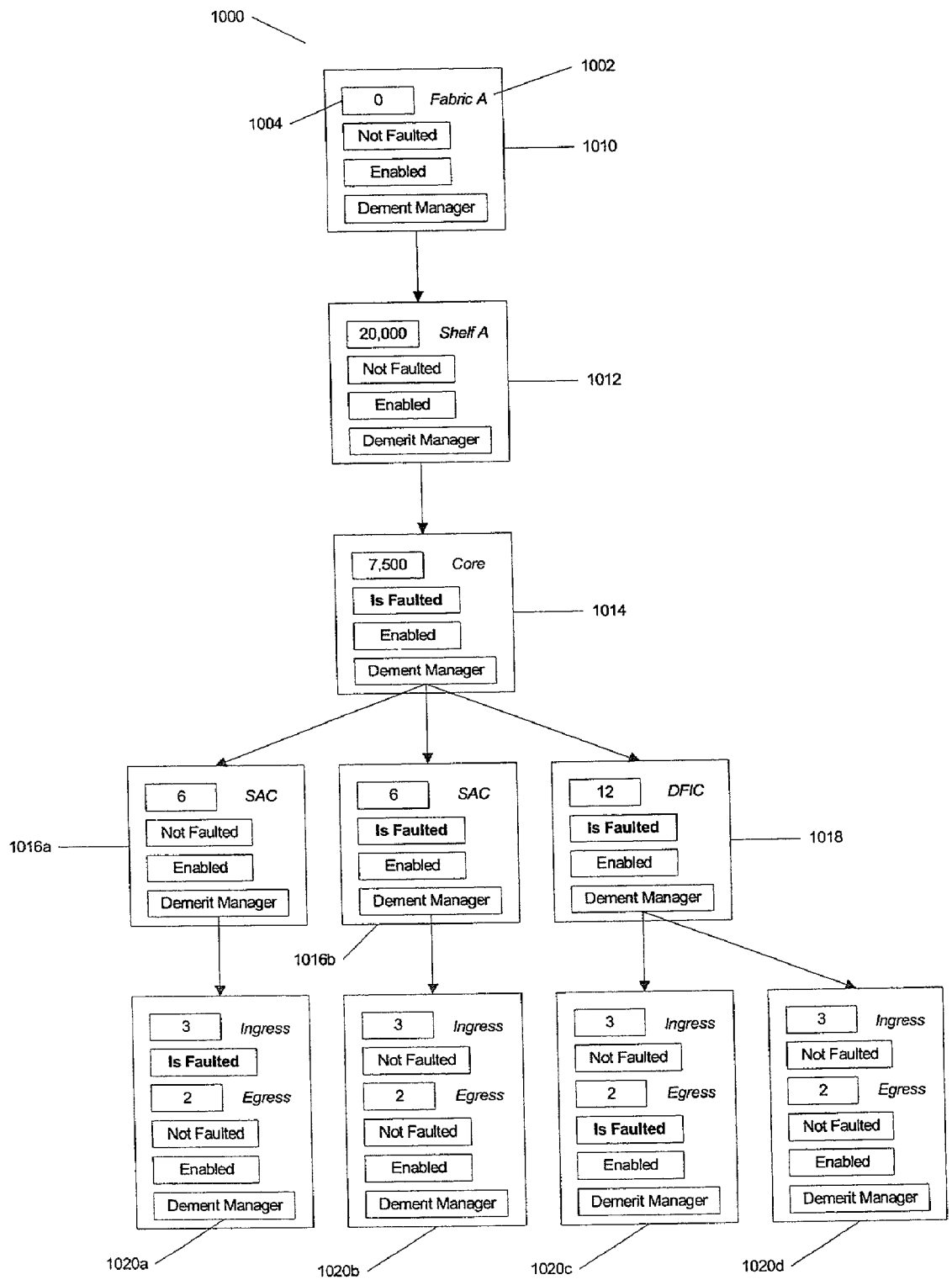
FIG. 10 is a block diagram of a scoring table for a fabric monitored by the fabric selection unit of FIG. 9A.

Referring to FIG. 10, data structure 1000 is shown illustrating an exemplary demerit score for the demerit engine of fabric A in operation. This example will also illustrate all levels of the existing hierarchy and how demerit suppression is enforced. At the head of data structure 1000 is head node 1010, which has identifier field 1002 for fabric A and score field 1004 for the demerit score calculated for fabric A. Head node 1010 is connected to node 1012, which is the switching shelf section of the hierarchy. Node 1012 is then connected to node 1014, which is the core section. Node 1014 is connected to 1016a, 1016b, and 1018, which represents the card level. Finally all nodes of the card level are connected to nodes of the port level. Each of these nodes 1012, 1014, 1016a, 1016b, 1018, 1020(*a–d*) represents a unique component in fabric A. Note that the Dual Fabric Interface Card (DFIC) has two ports, thus has two demerit objects. In FIG. 10 there are 5 fabric components that has reported errors against them, 1014, 1016b, 1018, 1020a, and 1020c. Accordingly, each element has been added to structure 1000. As errors are cleared for an element, the score is will be cleared. For the structure as shown, the total demerit score is 7500, demerit node 1014 suppresses lower level demerits. This value will be compared against the demerit score for fabric B. Whichever fabric has a lower score, that fabric is healthier and will be made the active fabric. If the core fault 1014 were to clear, the sum of lower level demerits would be accumulated. The demerit count would then be 6+12+3=21, the score for node 1020c is ignored because 1018 is faulted.

It will be appreciated by those skilled in the art that the embodiment has defined several modules which provide specific functionality for the system. However, it will be appreciated that the functionality may, in other embodiments, be divided amongst the modules, even amongst modules which do not have as close a relationship to the functionality as other modules. For example, some of the processing done by fault analysis unit 310 may be done by fabric selection unit 312 or vice versa.

It is noted that those skilled in the art will appreciate that various modifications of detail may be made to the present embodiment, all of which would come within the scope of the invention.

We claim:

1. A method of routing data through a communication device having respective switching fabrics providing active and redundant datapaths, and wherein either of said switching fabrics can be made active to provide the active datapath and wherein the other switching fabric provides the redundant datapath, said method comprising:
   (i) Continually monitoring for faults detected and cleared in said switchng fabrics;
   (ii) Reporting said detected and cleared faults to a demerit engine;
   (iii) Maintaining a record of the health of each switching fabric in said demerit engine;
   (iii) Updating said demerit engine as said cleared and detected faults are reported;
   (iv) Providing a mechanism to initiate rapid switching of the data from the active datapath to the redundant datapath upon detection of a fault;
   (iv) Disabling said mechanism while said demerit engine indicates the presence of faults in said switching fabrics; and
   (vi) Upon detection of a fault when said mechanism is disabled, applying a set of rules to determine which fabric to make active based on the health of the respective switching fabrics as determined by the records in said demerit engine.

2. The method as claimed in claim 1 wherein a fault is only recognized if it has a severity above a predetermined threshold.

3. A method of selecting a routing datapath between an active datapath and a redundant datapath for a communication device, said method comprising steps of
   (i) Monitoring said active datapath for faults in said active datapath and generating a first fault report upon detection of each of said faults in said active datapath;
   (ii) Monitoring said redundant datapath for faults in said redundant datapath and generating a second fault report upon detection of each of said faults in said redundant datapath;
   (iii) Upon detection of said first fault, switching said routing datapath to said redundant datapath;
   (iv) Monitoring for a subsequent fault occurring in said active datapath and said redundant datapath;
   (v) Tracking said subsequent fault with any previous faults for active and redundant datapaths and evaluating said subsequent fault with said any previous faults against a threshold by
      a) Receiving said first fault report from a first monitoring module and updating a first fault report for said active datapath;
      b) Receiving said second fault report from said second monitoring module and updating a second fault report for said redundant datapath; and
      c) Generating a comparison value of said first and second fault reports to identify which of said active and redundant datapaths has a better health; and
   (vi) If said threshold is exceeded and if said subsequent fault is associated with said active datapath switching said routing datapath of said communications from active datapath to said redundant datapath; and
   wherein earlier faults are cleared; said first and second fault reports are updated to remove said earlier faults; and said first and second fault reports utilize separate data structures each comprising an entry for each element reporting said faults.

4. The method of selecting a routing datapath between an active datapath and a redundant datapath as claimed in claim 3 wherein:
   data is sent through said active datapath and said redundant datapath at approximately the same time; and
   upon switching of said routing datapath, causing said switching of said routing datapath at an egress point in said communication device.

5. The method of selecting a routing datapath between an active datapath and a redundant datapath as claimed in claim 4 wherein said egress point is an egress line card in said communication device.

6. The method of selecting a routing datapath between an active datapath and a redundant datapath as claimed in claim 5 wherein
   said steps (i) and (vi) are conducted by a fault detection unit receiving fault messages from a driver associated with a physical location in said communication device related to said fault messages.

7. The method of selecting a routing datapath between an active datapath and a redundant datapath as claimed in claim 6 wherein
   said fault detection unit debounces said fault messages and reports said fault messages to a fault analysis unit associated with said physical location.

8. The method of selecting a routing datapath between an active datapath and a redundant datapath as claimed in claim 7 wherein
   said fault detection unit utilizes one state machine for each of said fault messages to denounce said fault messages.

9. The method of selecting a routing datapath between an active datapath and a redundant datapath as claimed in claim 7 wherein said fault analysis unit performs said step (iii).

10. The method of selecting a routing datapath between an active datapath and a redundant datapath as claimed in claim 8 wherein said fault detection unit utilizes global data to store information relating to each of said fault messages.

11. The method of selecting a routing datapath between an active datapath and a redundant datapath as claimed in claim 10 wherein for a given fault message, said fault detection unit accesses said global data to allow initiation of a state machine associated with said given fault.

12. The method of selecting a routing datapath between an active datapath and a redundant datapath as claimed in claim 11 wherein
   for said step (iv) said fault detection unit advises a fabric selection unit of said subsequent fault; and
   said fabric selection unit performs said step (v).

13. The method of selecting a routing datapath between an active datapath and a redundant datapath as claimed in claim 12 wherein said fabric selection unit is located at a central location in said communication device.

14. The method of selecting a routing datapath between an active datapath and a redundant datapath as claimed in claim 13 wherein said fabric selection unit assigns one of a plurality of fault weight values to each of said subsequent fault and said any previous faults.

15. A method of selecting a routing datapath between an active datapath and a redundant datapath of a communication device, said method comprising:
   (i) Maintaining first and second data structures associated with respective first and second sets of components, wherein said first and second data structures are associated with said respective active and redundant datapaths, and each data structure includes an entry for each component of its associated set of components;
   (ii) Monitoring for an event occurring in either said active datapath or said redundant datapath;
   (iii) Upon detection of said event
      (iii.1) Updating a first status associated with said first data structure if said event occurred in said active datapath; and
      (iii.2) Updating a second status associated with said second data structure if said event occurred in said redundant datapath;
   (iv) Performing an evaluation said first status and said second status against at least one failure threshold; and
   (v) Selecting said routing datapath according to said evaluation.

16. A switch providing a routing datapath between a first datapath in a first switching fabric and a second datapath in a second switching fabric, said switch comprising
   said first datapath being an active datapath;
   said second datapath being a redundant datapath for said active datapath;
   a fault detection unit associated with said first and second datapaths;
   a fault analysis unit associated with said fault detection unit;
   a fabric selection unit associated with said fault analysis unit, said fabric selection unit utilizing a demerit engine to maintain a record of the health of the first and second switching fabrics in response to detection and clearance of fault;
   a rapid switchover mechanism for effecting rapid switchover of said active and redundant data paths upon detection of a fault;
   said fabric selection unit disabling said rapid switchover mechanism in the presence of faults recorded by said demerit engine; and
   wherein if said rapid switchover mechanism is disabled said fabiic selection unit applies a set of rules based on the health of said first and second switching fabrics as determined from said demerit engine.

17. A switch providing a routing datapath between a first datapath in a first switching fabric and a second datapath in a second switching fabric, said switch comprising
   said first datapath being an active datapath;
   said second datapath being a redundant datapath for said active datapath;
   a fault detection unit associated with said first and second datapaths;
   a fault analysis unit associated with said fault detection unit; and
   a fabric selection unit associated with said fault analysis unit, wherein
   said fault detection unit monitors for a first fault occurring in said active datapath;
   upon detection of said first fault, said fabric selection unit switches said routing datapath to said redundant datapath;
   said fault detection unit monitors for a subsequent fault occurring in said active datapath and said redundant datapath;
   said fault analysis unit tracks and reports said subsequent fault to said fabric selection unit;
   wherein said fabric selection unit maintains first and second data structures which track demerit scores for said first and second switching fabrics based on reports received from said fabric selection unit, and said data structures comprise an entry for each element of said first and second switching fabrics reoorting faults; and
   wherein upon detection of a fault said fabric selection unit determines whether to switchover said active and redundant datapaths based on the scores in said first and second datastructures.

18. The switch as claimed in claim 17 wherein
   said fault detection unit also
      monitors said active datapath for faults in said active datapath and advises said fault analysis unit of said faults in said active datapath; and
      monitors said redundant datapath for faults in said redundant datapath and and advises said fault analysis unit of said faults in said active datapath, and
   said fault analysis unit also
      generates a first fault report of said faults in said active datapath and provides same to said fabric selection unit; and
      generates a second fault report of said faults in said redundant datapath and provides some to said fabric selection unit.

19. The switch as claimed in claim 18 wherein said fabric selection unit also generates a comparison value of said first and second fault reports to identify which of said active and redundant datapaths has a better health.

20. The method as claimed in claim 1, wherein said demerit engine comprises first and second data structures containing entries corresponding to elements of said first and second switching fabrics reporting faults.

21. The method as claimed in claim 1, wherein different demerit weights are assigned to different faults conditions in said demerit engine, and said set of rules takes into account said different weights in determining which switch fabric to make active.

22. The switch as claimed in claim 16, wherein said demerit engine comprises first and second data structures containing entries corresponding to elements of said first and second switching fabrics reporting faults.

23. The method as claimed in claim 1, wherein said demerit engine is configured to assign different demerit weights to different faults conditions in said demerit engine, and said fabric selection unit account said different weights in determining which switch fabric to make active.

* * * * *